United States Patent
Kido

(10) Patent No.: US 9,191,532 B2
(45) Date of Patent: Nov. 17, 2015

(54) IMAGE DISPLAY DEVICE AND COMPUTER-READABLE STORAGE MEDIUM STORING A DISPLAY CONTROL PROGRAM

(75) Inventor: Kirihito Kido, Osaka (JP)

(73) Assignee: KYOCERA MITA CORPORATION (JP)

( * ) Notice: Subject to any disclaimer, the term of this patent is extended or adjusted under 35 U.S.C. 154(b) by 1034 days.

(21) Appl. No.: 13/049,091

(22) Filed: Mar. 16, 2011

(65) Prior Publication Data

US 2011/0239162 A1 Sep. 29, 2011

(30) Foreign Application Priority Data

Mar. 23, 2010 (JP) .................. 2010-066433
Mar. 23, 2010 (JP) .................. 2010-066473

(51) Int. Cl.
*G06F 3/0482* (2013.01)
*H04N 1/00* (2006.01)
*H04N 1/32* (2006.01)

(52) U.S. Cl.
CPC ......... *H04N 1/0044* (2013.01); *H04N 1/00474* (2013.01); *H04N 1/00482* (2013.01); *G06F 3/0482* (2013.01); *H04N 1/00456* (2013.01); *H04N 1/00472* (2013.01); *H04N 1/32101* (2013.01); *H04N 2201/0094* (2013.01); *H04N 2201/325* (2013.01); *H04N 2201/3226* (2013.01); *H04N 2201/3232* (2013.01); *H04N 2201/3273* (2013.01)

(58) Field of Classification Search
CPC ...................... G06F 3/12; G06F 15/00; G06F 3/0481–3/0482; G06F 17/211–17/212; H04N 1/0044; H04N 1/00456

USPC .................................................. 715/838, 274
See application file for complete search history.

(56) References Cited

U.S. PATENT DOCUMENTS

2004/0207859 A1 10/2004 Kadoi et al.
2007/0070470 A1* 3/2007 Takami et al. ................ 358/527
2007/0297010 A1* 12/2007 Kotani et al. ................ 358/1.18

(Continued)

FOREIGN PATENT DOCUMENTS

JP 2000339327 12/2000
JP 2001-5805 1/2001

(Continued)

*Primary Examiner* — Amy Ng
*Assistant Examiner* — Roland Casillas
(74) *Attorney, Agent, or Firm* — Gerald E. Hespos; Michael J. Porco; Matthew T. Hespos

(57) ABSTRACT

A multifunction peripheral is provided with a thumbnail image generation instruction receiving section that receives an instruction to generate a thumbnail image of a page designated by an operator, a thumbnail image generating section that generates thumbnail images of pages constituting image data, a display controller that causes the display unit to display the thumbnail image and a pop-up image indicating the pages received by the thumbnail image generation instruction receiving section, and a page designation receiving section that receives the page designated by the operator out of the pages indicated by the pop-up image. When page designation from the operator is received by the page designation receiving section, the display controller causes the thumbnail image of the received page to be displayed.

6 Claims, 18 Drawing Sheets

(56) References Cited

U.S. PATENT DOCUMENTS

2008/0309984 A1* 12/2008 Minami et al. ............... 358/301
2010/0162103 A1* 6/2010 Eom et al. .................... 715/255

FOREIGN PATENT DOCUMENTS

| JP | 2004-318581 | 11/2004 |
| JP | 2007150556 | 6/2007 |

* cited by examiner

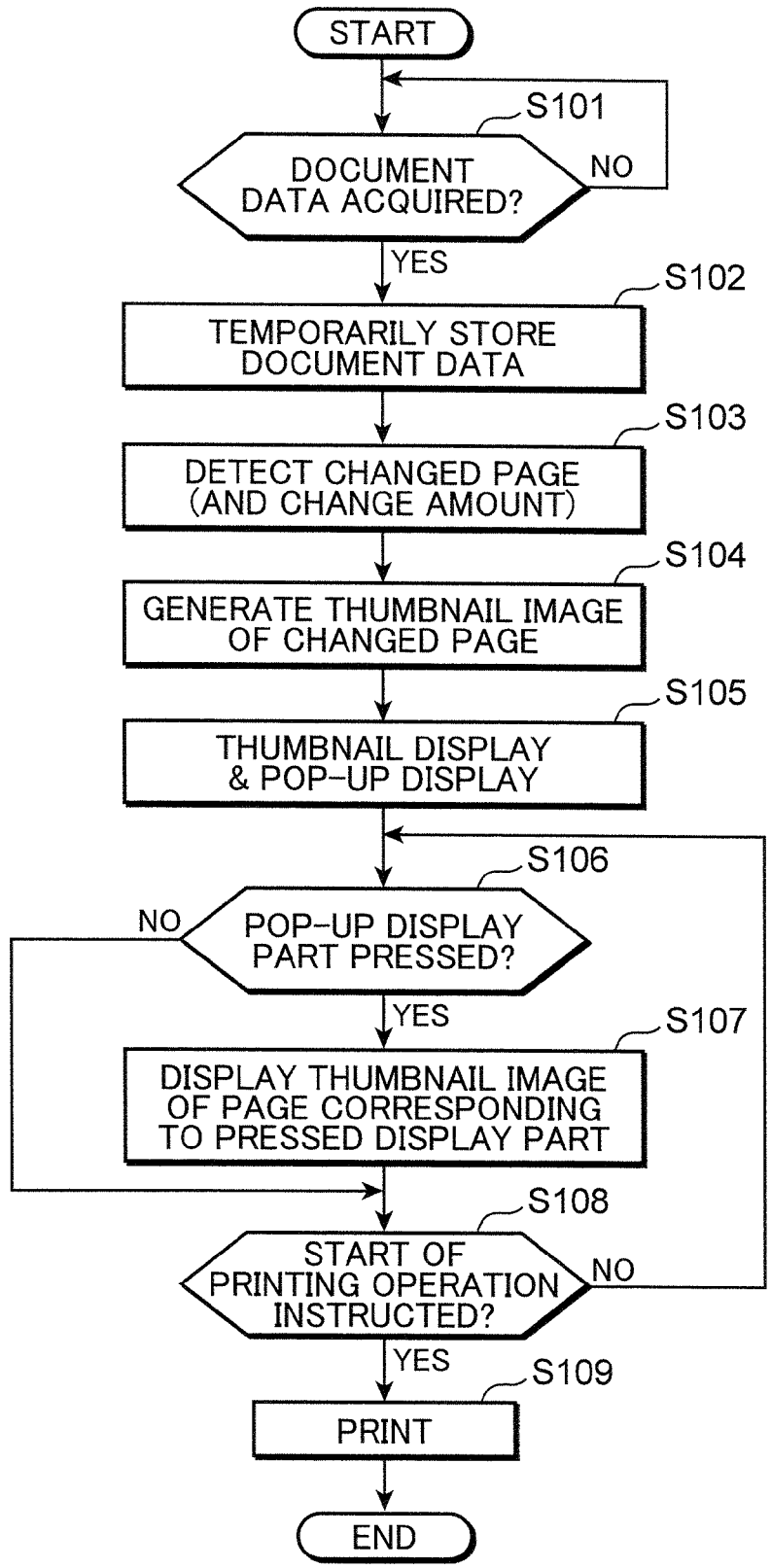

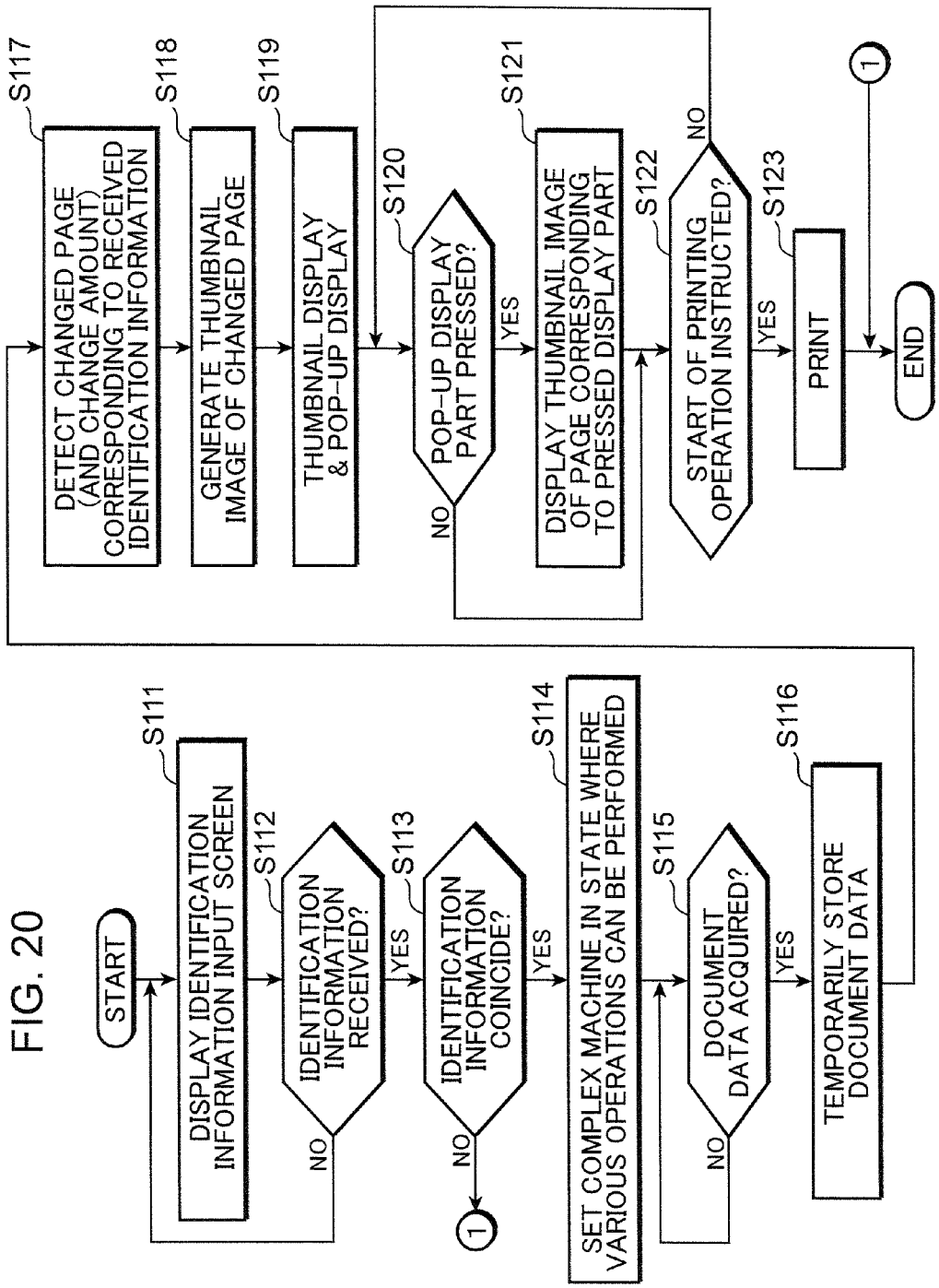

IMAGE DISPLAY DEVICE AND COMPUTER-READABLE STORAGE MEDIUM STORING A DISPLAY CONTROL PROGRAM

BACKGROUND OF THE INVENTION

1. Field of the Invention

The present invention relates to an image display device and a computer-readable storage medium storing a display control program and particularly to a display technology of a display unit for confirming a content of an image to be printed.

2. Description of the Related Art

Conventionally, there has been proposed an image forming apparatus such as a copier as an example including an image display device in which document ID marks are provided, for example, on a retrieval sheet to retrieve image data desired by an operator from image data stored in a storage device and thumbnail images of documents corresponding to these document ID marks are displayed on a display unit to enable the operator to confirm contents of respective documents, so that the operator can retrieve image data of a desired document from the storage device.

Further, some of known image forming apparatuses such as copiers are such that an image of a document read to be copied is preview-displayed on a display unit such as an LCD (Liquid Crystal Display) before being formed on a recording sheet. For example, there is a print preview display method by which document images of a plurality of pages are displayed on a display screen of the display unit while being displaced from each other by a specified width, whereby a user can grasp a content to be printed and that the document images of the plurality of pages are to be printed.

SUMMARY OF THE INVENTION

The present invention is a further improvement of the above prior art.

Specifically, the present invention is directed to an image display device, comprising a display unit that displays an image; a thumbnail image generating section that generates thumbnail images of at least one or more images out of images of respective pages constituting image data; a display controller that causes the display unit to display the thumbnail image of any page generated by the thumbnail image generating section and a pop-up image indicating the pages for which the thumbnail images were generated by the thumbnail image generating section; and a page designation receiving section that receives the page designated by an operator out of the pages indicated by the pop-up image caused to be displayed by the display controller; wherein, when page designation from the operator is received by the page designation receiving section, the display controller causes the display unit to display the thumbnail image of the received page instead of the thumbnail image displayed on the display unit at this point of time.

These and other objects, features and advantages of the present invention will become more apparent upon reading the following detailed description along with the accompanying drawings.

BRIEF DESCRIPTION OF THE DRAWINGS

FIG. 18 is a flow chart showing a first embodiment of a thumbnail image display process in the multifunction peripheral.

FIG. 20 is a flow chart showing a second embodiment of the thumbnail image display process in the multifunction peripheral.

DETAILED DESCRIPTION OF THE PREFERRED EMBODIMENTS

Figure 1:
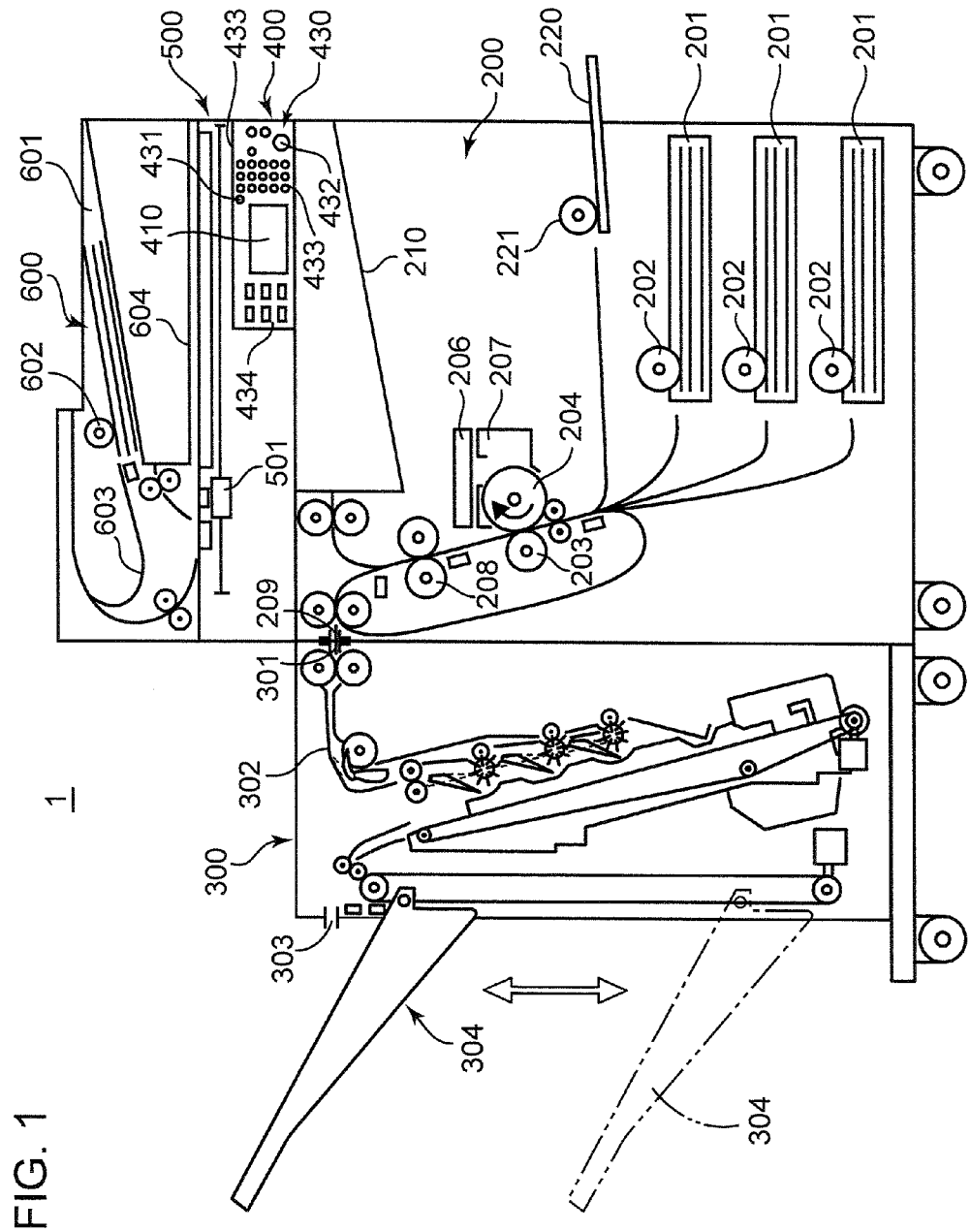
FIG. 1 is a schematic side view in section showing a construction of a multifunction peripheral as an example of an image forming apparatus including an image display device according to one embodiment of the invention.
Figure 2:
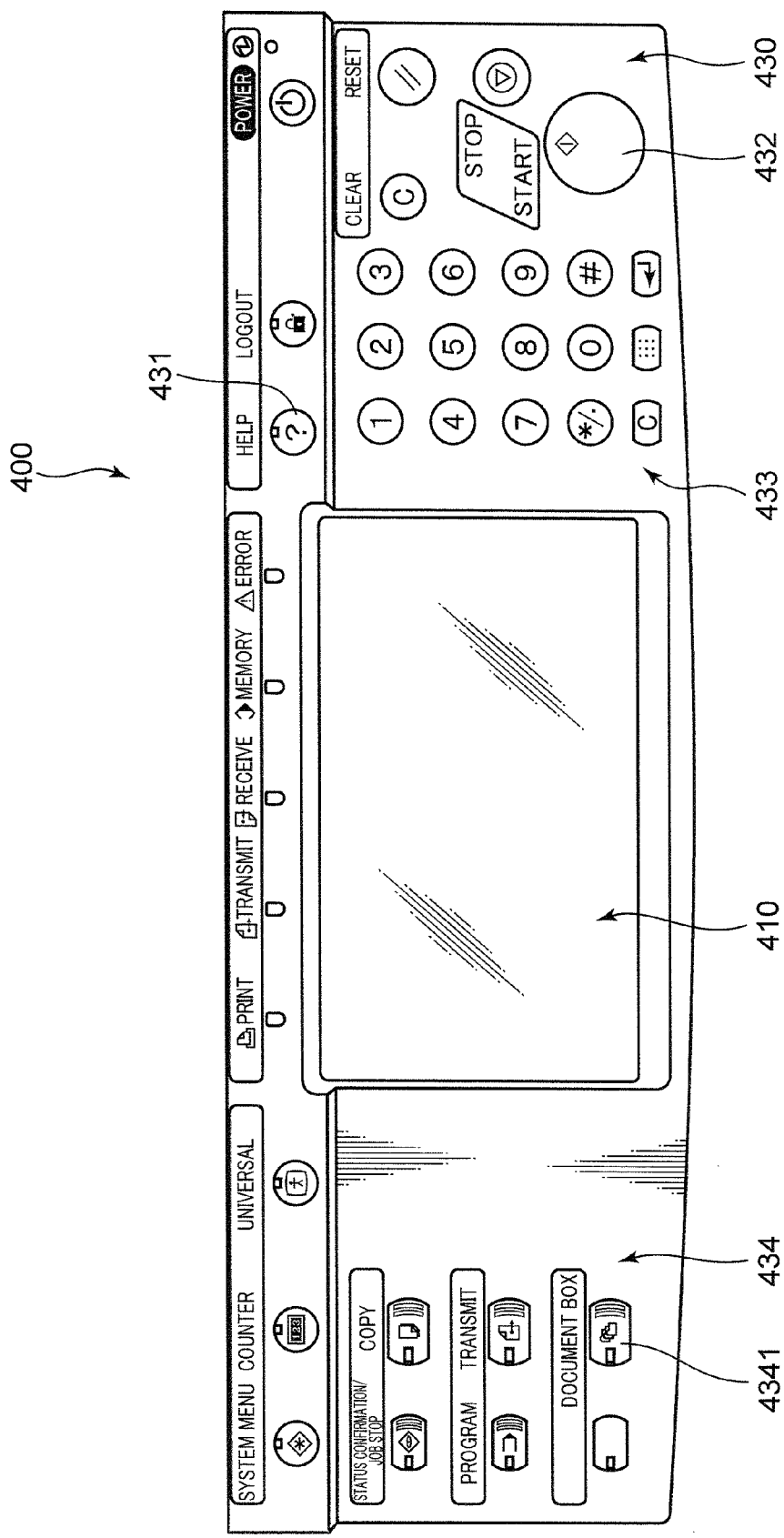
FIG. 2 is a partial enlarged view of an operation unit.

Hereinafter, there are described embodiments of an image display device and a computer-readable storage medium storing a display control program according to the present invention. FIG. 1 is a schematic side view in section showing a construction of a multifunction peripheral as an example of an image forming apparatus including the image display device according to one embodiment of the invention. FIG. 2 is a partial enlarged view of an operation unit 400. The multifunction peripheral 1 has a combination of a scanner function, a facsimile function, a printer function, a copy function, and other functions. The multifunction peripheral 1 is provided with a main unit 200, a sheet post-processing unit 300 arranged on a sheet carry-out side, e.g. on the left side of the main unit 200, the operation unit 400 used by an operator to enter various operation instructions and the like, a document reading unit 500 arranged on the main unit 200 and a document feeding unit 600 arranged on the document reading unit 500.

As also shown in FIG. 2, the operation unit 400 includes a display unit 410 composed of an LCD (Liquid Crystal Display) and the like, and an operation key unit 430 used by the operator to enter operation instructions. The operation key unit 430 includes a help key 431, a start button 432, a numerical pad 433, function changeover keys 434 and the like.

The help key 431 receives an instruction to cause the display unit 410 to display an operation screen (help screen) displaying operation methods relating to the scanner function, the facsimile function, the printer function, the copy function and the other functions from the operator.

The start button 432 receives instructions to start operations such as a copying operation and a scanning operation from the operator. The numerical pad 433 includes keys for receiving instructions designating the number of copies and the like from the operator. In this embodiment, the numerical pad 433 functions as an information input unit for receiving input of information (e.g. user box number) necessary for input of an operation instruction corresponding to an operation screen being displayed on the display unit 410.

The function changeover keys 434 are keys for receiving instructions from the operator to switch the function among a copy function, a transmit function (scanner function, the facsimile function, etc.), a document box function (function of reading data stored in a storage area (mail box) provided in an HDD 74 to be described later and given to each operator and printing the read data) and other functions.

The display unit 410 includes a touch panel unit composed of the LCD (Liquid Crystal Display) and the like and having a touch panel function. The display unit 410 can display various operation screens and enables the operator to enter execution commands of various functions by touching a display surface (displayed operation keys).

The document feeding unit 600 includes a document placing portion 601, a feed roller 602, a document conveying unit 603 and a document discharging portion 604. The document reading unit 500 (an example of an image data acquiring section) includes a scanner 501. The feed roller 602 feeds a necessary number of documents set on the document placing portion 601 one by one, and the document conveying unit 603 successively conveys the fed documents to a reading position of the scanner 501. The scanner 501 successively reads images of the documents being conveyed, and the documents having the images thereof read are discharged onto the document discharging portion 604.

The main unit 200 includes a plurality of sheet cassettes 201, a plurality of pickup rollers 202, a transfer roller 203, a photoconductive drum 204, an exposure device 206, a developing device 207, a fixing roller 208, a discharge port 209, a discharge tray 210, etc.

The photoconductive drum 204 is uniformly charged by a charger (not shown) while being rotated in an arrow direction. The exposure device 206 scans a laser beam modulated in accordance with an image of a document read by the document reading unit 500 across a surface of the photoconductive drum 204 to form an electrostatic latent image on the drum surface. The developing device 207 supplies black developer to the photoconductive drum 204 to form a toner image.

On the other hand, the pickup roller 202 picks up a recording sheet from the sheet cassette 201 containing recording sheets and feeds it to the transfer roller 203. The transfer roller 203 transfers the toner image formed on the photoconductive drum 204 to the conveyed recording sheet, and the fixing roller 208 fixes the transferred toner image to the recording sheet by applying heat. Thereafter, the recording sheet is carried into the sheet post-processing unit 300 through the discharge port 209 of the main unit 200. Further, the recording sheet may be discharged to the discharge tray 210 according to need.

The sheet post-processing unit 300 includes a carry-in port 301, a recording sheet conveying unit 302, a carry-out port 303, a stack tray 304, etc. The recording sheet conveying unit 302 successively conveys recording sheets brought to the carry-in port 301 through the discharge port 209 and finally discharges the recording sheets to the stack tray 304 through the carry-out port 303. The stack tray 304 is so constructed as to be vertically movable in arrow directions according to the number of recording sheets carried out through the carry-out port 303.

Figure 3:
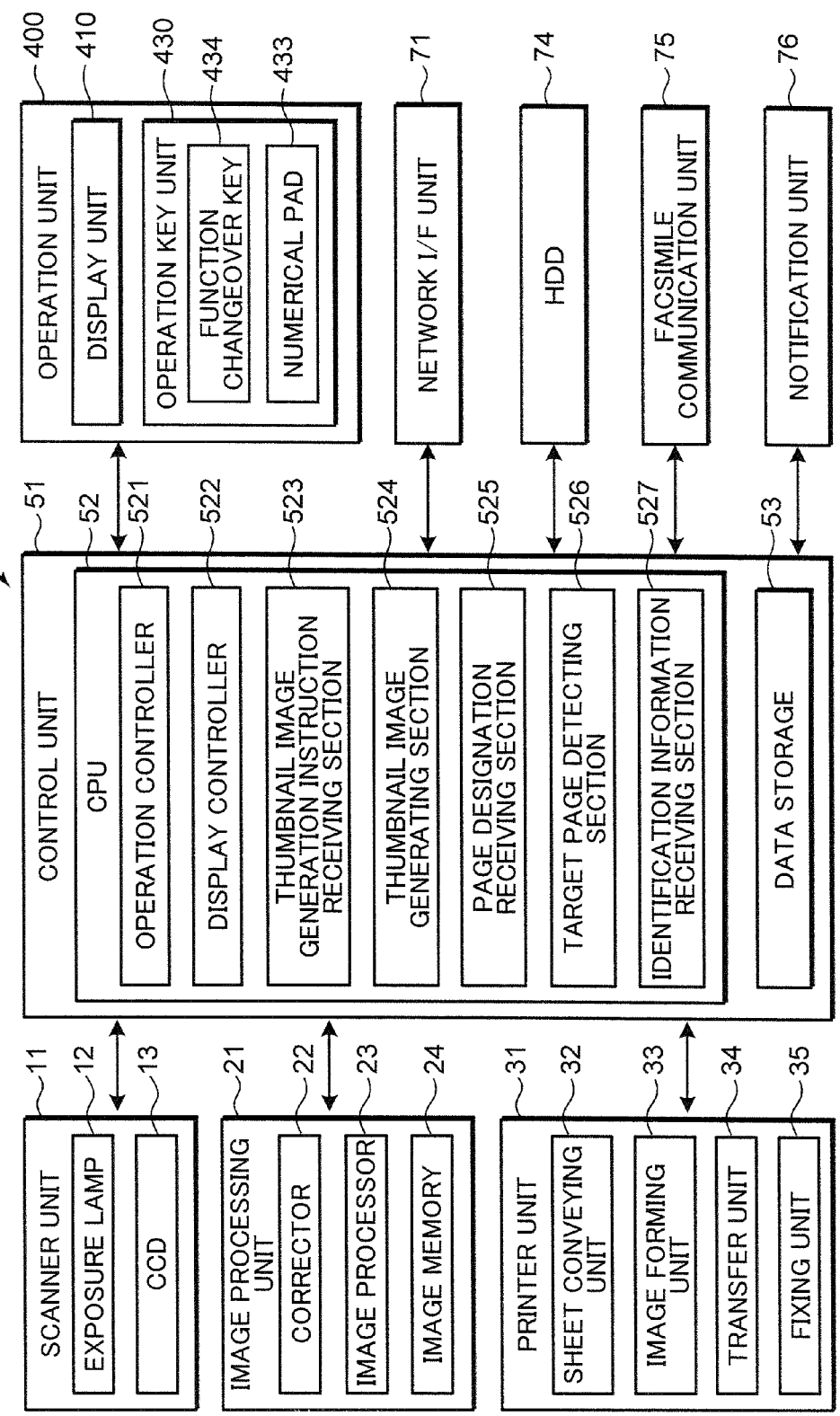
FIG. 3 is a control block diagram of the multifunction peripheral shown in FIG. 1.

FIG. 3 is a control block diagram of the multifunction peripheral shown in FIG. 1. As shown in FIG. 3, the multifunction peripheral 1 is provided with a scanner unit 11, an image processing unit 21, a printer unit 31, the operation unit 400, a control unit 51, a network I/F (interface) unit 71, the HDD (hard disk drive) 74 and a facsimile communication unit 75.

The scanner unit 11 includes an exposure lamp 12 and a CCD (Charge-Coupled Device) 13 constituting the scanner 501 shown in FIG. 1. The scanner unit 11 irradiates a document by the exposure lamp 12 and receives reflected light by the CCD 13, thereby reading an image from the document and outputting an image corresponding to the read image to the image processing unit 21.

The image processing unit 21 includes a corrector 22, an image processor 23 and an image memory 24. The image processing unit 21 processes a read image using the corrector 22 and the image processor 23, if necessary. The image processed by the image processing unit 21 is stored for printing purpose in the image memory 24 or output to the printer unit 31. The corrector 22 applies specified correction processings such as a level correction and a γ correction to the read image. The image processor 23 applies various processings such as compression or expansion and size enlargement or reduction of the image.

The printer unit 31 includes a sheet conveying unit 32 composed of the sheet cassettes 201, the pickup rollers 202 and the like shown in FIG. 1, an image forming unit 33 composed of the photoconductive drum 204, the exposure device 206, the developing device 207 and the like shown in FIG. 1, a transfer unit 34 composed of the transfer roller 203 and the like shown in FIG. 1, and a fixing unit 35 composed of the fixing roller 208 and the like shown in FIG. 1. The printer unit 31 prints an image on a recording sheet using document data read by the scanner unit 11. Specifically, the sheet conveying unit 32 conveys the recording sheet to the image forming unit 33, the image forming unit 33 forms a toner image corresponding to the above image, the transfer unit 34 transfers the toner image to the recording sheet, and the fixing unit 35 forms an image by fixing the toner image to the recording sheet.

The network I/F unit 71 controls transmission and reception of various data to and from external apparatuses, e.g. a LAN-connected personal computer, via a LAN using a network interface (10/100 Base-TX) or the like. The HDD 74 stores images read by the scanner unit 11 and output formats and the like set for these images.

The operation unit 400 includes the display unit 410 and the operation key unit 430 as shown in FIGS. 1 and 2. The display unit 410 displays a plurality of keys for receiving input of various instructions by the touch panel function under the control of the control unit 51.

The operation key unit 430 includes the function changeover keys 434, the start button 432, the numerical pad 433 and the like shown in FIG. 2. A CPU 52 of the control unit 51 receives instructions input by the operator from the respective keys of the display unit 410 and the operation unit 400.

The facsimile communication unit 75 includes an encoder/decoder (not shown), a modulator/demodulator (not shown) and an NCU (Network Control Unit) (not shown). The facsimile communication unit 75 transmits document image data read by the scanner unit 11 to a facsimile machine or the like via a telephone line and receives image data transmitted from a facsimile machine or the like. The encoder/decoder compresses and encodes image data to be transmitted and expands and decodes received image data. The modulator/demodulator modulates compressed and encoded image data into a sound signal and demodulates a received signal (sound signal) into image data. The NCU controls connection with facsimile machines and the like as transmission and reception destinations by the telephone line.

The control unit 51 includes the CPU 52 and a data storage 53. The CPU 52 is responsible for an operation control of the multifunction peripheral 1.

The data storage 53 is composed of a memory and the like and stores various data used to display operation screens for operation guidance to the operator and image data (including images, characters, symbols and other data) for display screens for displaying operating conditions of the scanner function, the facsimile function, the printer function, the copy function and other functions. The data storage 53 also temporarily stores image data of a document read by the document reading unit 500, image data obtained from the LAN-connected personal computer by the network I/F unit 71 or image data of a document stored in the HDD 74 (or external memory or the like connected to the multifunction peripheral 1 via an unillustrated I/F) for image formation and for generation of a thumbnail image (for confirmation of an image data content by the operator) of this image data.

The CPU 52 includes an operation controller 521, a display controller 522, a thumbnail image generation instruction receiving section 523, a thumbnail image generating section 524, a page designation receiving section 525, a target page detecting section 526 and an identification information receiving section 527.

The operation controller 521 is responsible for operation controls of the respective units (operation unit 400, scanner unit 11, image processing unit 21, printer unit 31, etc.) of the multifunction peripheral 1.

The display controller 522 controls a display operation of the display unit 410. The display controller 522 reads image data and the like necessary to display an operation screen from the data storage 53 and causes the display unit 410 to display the operation screen.

The thumbnail image generation instruction receiving section 523 receives an instruction to generate a thumbnail image of a page designated by the operator based on the operation of the operation unit 400 by the operator for each page of each file for image data of a document read by the document reading unit 500, image data obtained from the LAN-connected (or Internet-connected) personal computer by the network I/F unit 71 and image data of a document stored in the HDD 74 (or external memory or the like connected to the multifunction peripheral 1 via the unillustrated I/F) (hereinafter, these image data are written as document data), which data are temporarily stored in the data storage 53 (The HDD 74 may be used as a temporary storage area instead of the data storage 53. Note that the data storage 53 and the HDD 74 are an example of an image data storage mentioned in claims), for example, when the document data are files.

The thumbnail image generating section 524 generates a thumbnail image by applying a size reduction process or the like to an image indicated by document data. The thumbnail image generating section 524 generates thumbnail images of, for example, the front page of the document data and the page received by the thumbnail image generation instruction receiving section 523. The thumbnail image generating section 524 generates at least a thumbnail image of the page received by the thumbnail image generation instruction receiving section 523.

The display controller 522 causes the display unit 410 to display the thumbnail image of the page generated by the thumbnail image generating section 524 and a pop-up image indicating the pages (page number information) received by the thumbnail image generation instruction receiving section 523.

The page designation receiving section 525 receives a page designated by the operator as a page, a thumbnail image of which is to be displayed, based on the operation of the operation unit 400 by the operator from pages indicated by the pop-up image displayed by the display controller 522. The display controller 522 causes the display unit 410 to display the thumbnail image of the received page when page designation from the operator is received by the page designation receiving section 525. At this time, when the thumbnail image is already displayed on the display unit 410, the display controller 522 causes the display unit 410 to display the thumbnail image of the page, whose designation was received by the page designation receiving section 525, instead of this thumbnail image being displayed.

The target page detecting section 526 detects pages having a character area occupancy of a predetermined value (e.g. 70%) or higher, pages having a picture area occupancy of a predetermined value (e.g. 40%) or higher, pages including images indicating frames, or pages including images substantially matching already registered images.

For the detection of a character area from a document image constituting each page by the target page detecting section 526 is used a technology for extracting the character area, where, for example, a caption, body text and the like are written, excluding pictures and the like from the image of each page constituting the document data. For example, an edge detection process technique can be, for example, used as the technology for extracting the character area. In this case, the target page detecting section 526 assumes respective pixels constituting the image of each page successively as target pixels, extracts the target pixels and their surrounding pixels and performs an edge detecting process for detecting edge pixels constituting the outline of the image by applying a filtering process using an edge detection filter to these pixels. If an edge is detected in this edge detecting process, the target page detecting section 526 determines the target pixels as edge pixels and determines the character area based on the edge pixels. For example, the target page detecting section 526 calculates difference values in luminance between a target pixel and eight neighboring pixels adjacent to the target pixel, and determines this target pixel to be an edge pixel constituting a character if the number of the difference values larger than a predetermined threshold value is a specified number or greater (e.g. four or more). The target page detecting section 526 divides an image area to be detected into a predetermined number of areas and, if a predetermined threshold number of or more edge pixels are present in each divided area, extracts the area where the predetermined threshold value of or more edge pixels are present as a character area. Then, the target page detecting section 526 calculates the character area occupancy for each page constituting the document data.

The detection of a picture area from each area by the target page detecting section 526 is, for example, performed as follows. For example, if the document data is color image data, the target page detecting section 526 binarizes each pixel constituting one page of a document image (area to be determined) by converting a pixel value (in 256 gradation levels) composed of color components of R (red), G (green) and B (blue) into lightness data using a known conversion equation. Then, the target page detecting section 526 performs eight-connection labeling to the binarized image and determines an area of each labeled image as a picture area when the size of the area is larger than a predetermined size (e.g. size equivalent to a character). Then, the target page detecting section 526 calculates the picture area occupancy for each page constituting the document data.

The detection of an area including an image indicating a frame from each of the above areas is, for example, performed as follows. For example, the target page detecting section 526 detects for the image in each divided area whether or not there is any image having a rectangular shape made up by pixels which are consecutively arranged in a main scanning direction and whose values lie in a predetermined range and pixels which are consecutively arranged in a sub scanning direction and whose values lie in a predetermined range, i.e. any image representing a frame. In this way, the target page detecting section 526 detects the page where the image representing the frame is present from the respective pages constituting the document data.

The detection of an area including an already registered image from each of the above areas by the target page detecting section 526 is, for example, performed as follows. For example, the target page detecting section 526 compares the values of the pixels at respective positions constituting the image in each of the divided areas with the values of the pixels at the respective positions constituting the already registered image to determine whether or not the already registered image is included in the image in each divided area. In this way, the target page detecting section 526 detects the page where the already registered image is present from the respective pages constituting the document data.

The identification information receiving section 527 receives input of identification information (ID or the like allotted to and unique to each operator) for identifying each operator for each different operator through the operation of the operation unit 400 by the operator.

When the identification information receiving section 527 receives the identification information, the thumbnail image generation instruction receiving section 523 can receive and store a thumbnail image generation instruction of each page for each piece of identification information received by the identification information receiving section 527 for the document data. In this case, the display controller 522 causes a pop-up image indicating the pages received by the thumbnail image generation instruction receiving section 523 to be displayed for each piece of identification information received by the identification information receiving section 527.

The image display device according to one embodiment of the present invention is provided with the operation unit 400, the display unit 410, the display controller 522, the thumbnail image generation instruction receiving section 523, the thumbnail image generating section 524, the page designation receiving section 525 and the data storage 53 (or HDD 74) as an image data storage and further with the target page detecting section 526 or the identification information receiving section 527 according to the need of the process.

The display control program according to one embodiment of the present invention is stored in a storage medium in the multifunction peripheral 1 such as the HDD 74 and the CPU 52 functions as the display controller 522, the thumbnail image generation instruction receiving section 523, the thumbnail image generating section 524, the page designation receiving section 525, the target page detecting section 526 and the identification information receiving section 527 by performing an operation control in accordance with the display control program. This display control program is stored in the HDD 74 or the like by being read from a CD-ROM or DVD or being downloaded from a server on the Internet by the network I/F unit 71.

However, the realization of the display controller 522, the thumbnail image generation instruction receiving section 523, the thumbnail image generating section 524, the page designation receiving section 525, the target page detecting section 526 and the identification information receiving section 527 is not limited to by the operation control of the CPU 52 in accordance with the display control program, and the display controller 522, the thumbnail image generation instruction receiving section 523, the thumbnail image generating section 524, the page designation receiving section 525, the target page detecting section 526 and the identification information receiving section 527 may be provided as hardware in the form of circuits or the like.

Figure 4:
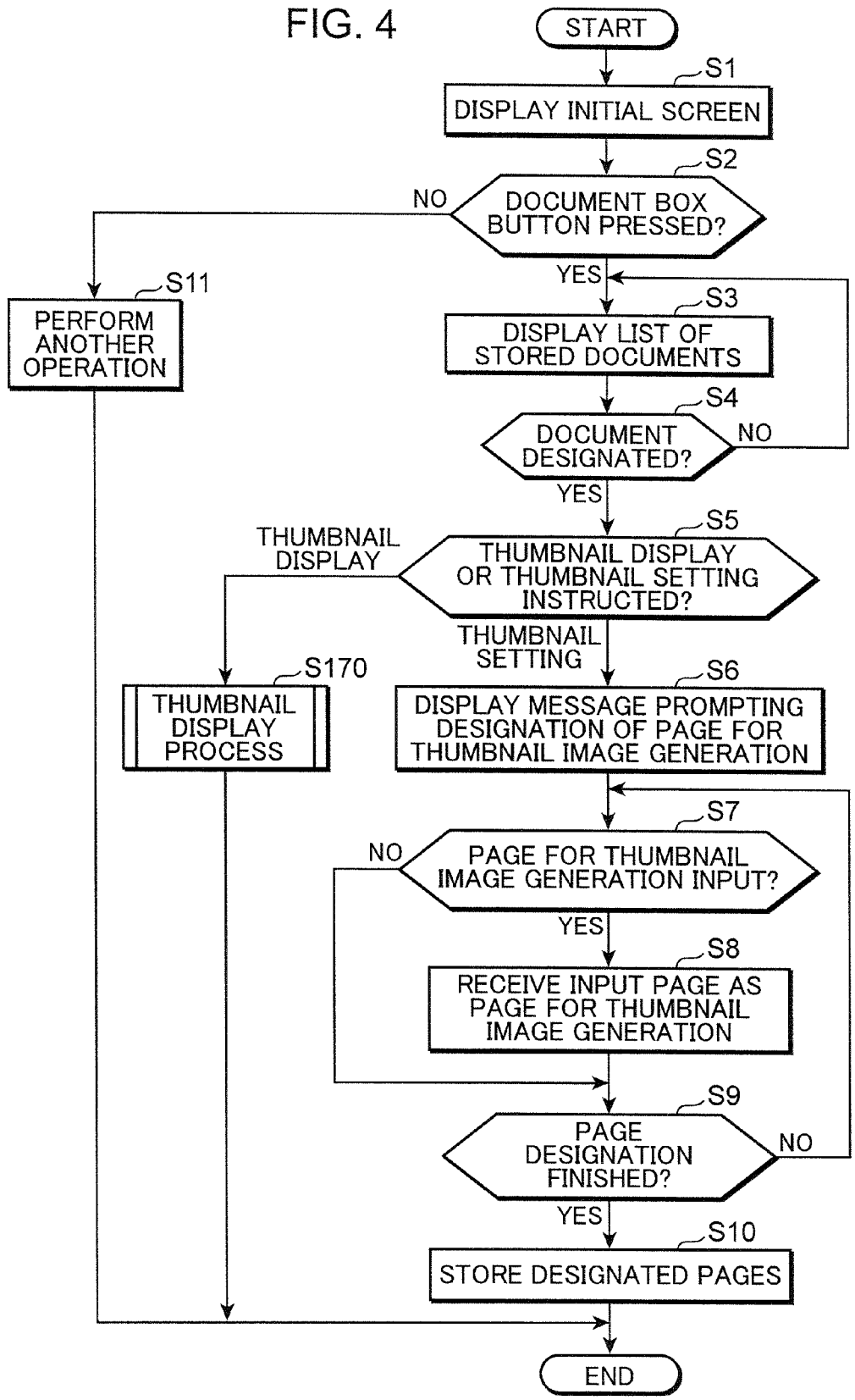
FIG. 4 is a flow chart showing a first embodiment of a process performed at the time of setting for thumbnail image generation for image data in the multifunction peripheral.
Figure 5:
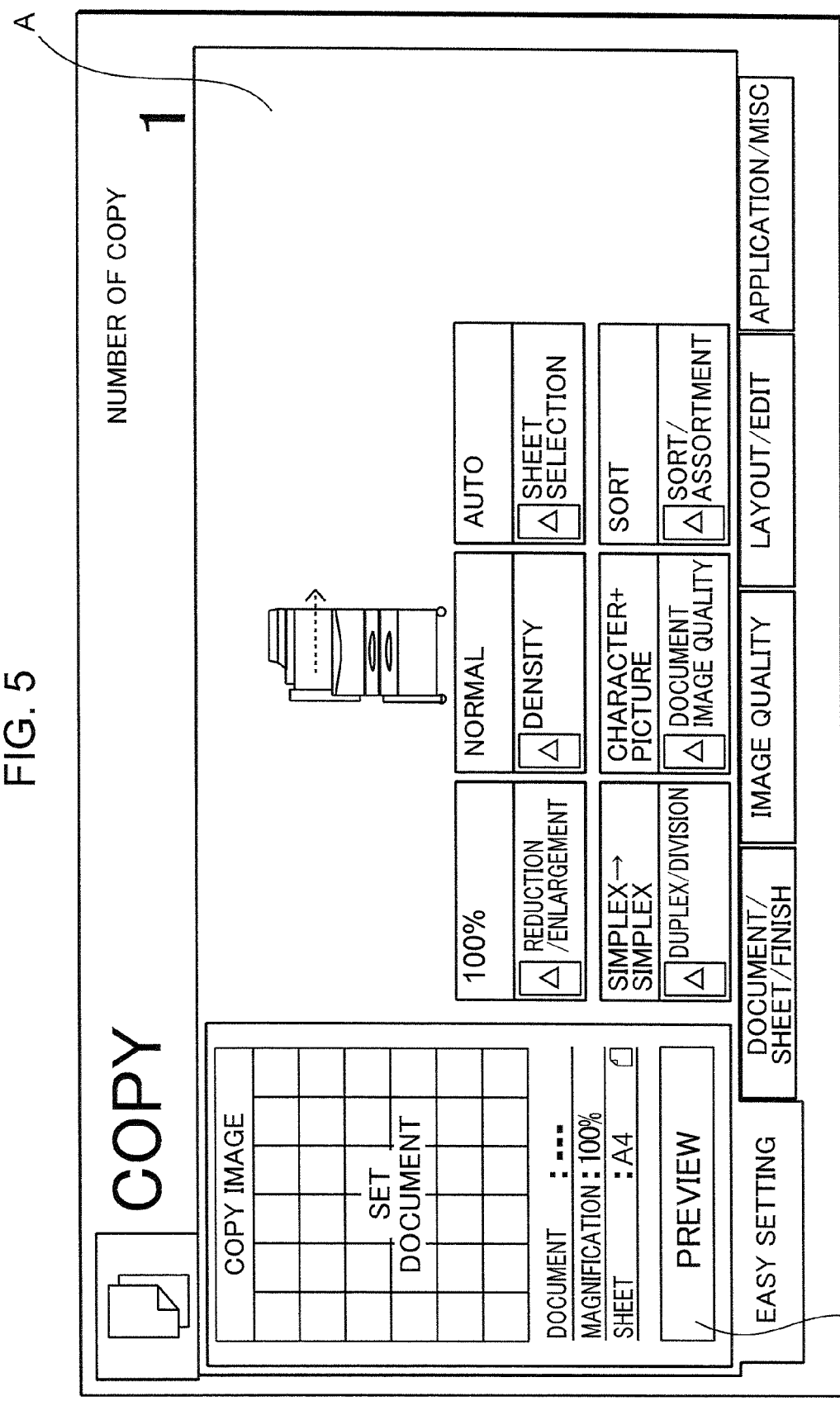
FIG. 5 is a diagram showing an exemplary display screen.
Figure 6:
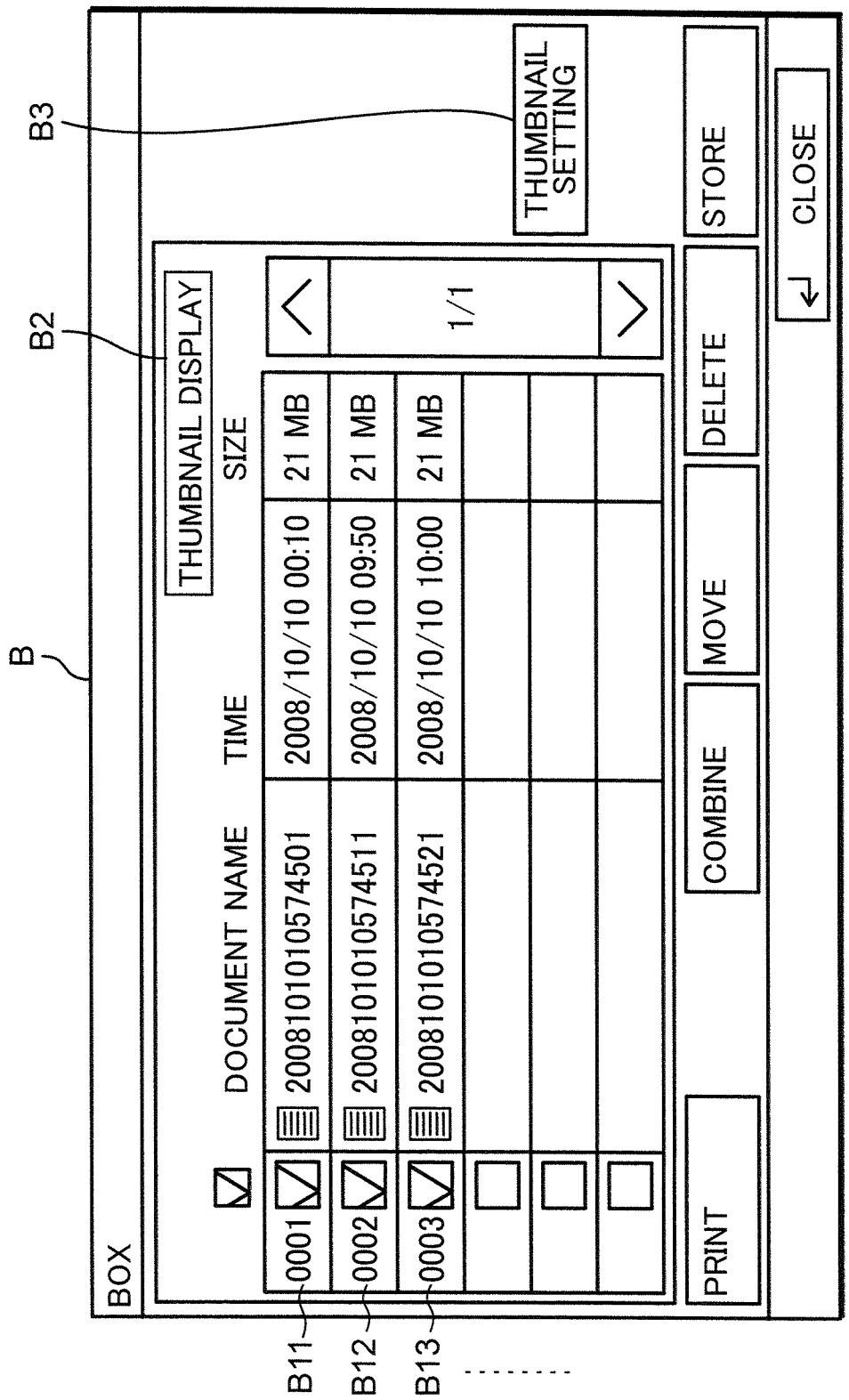
FIG. 6 is a diagram showing an exemplary display screen.
Figure 7:
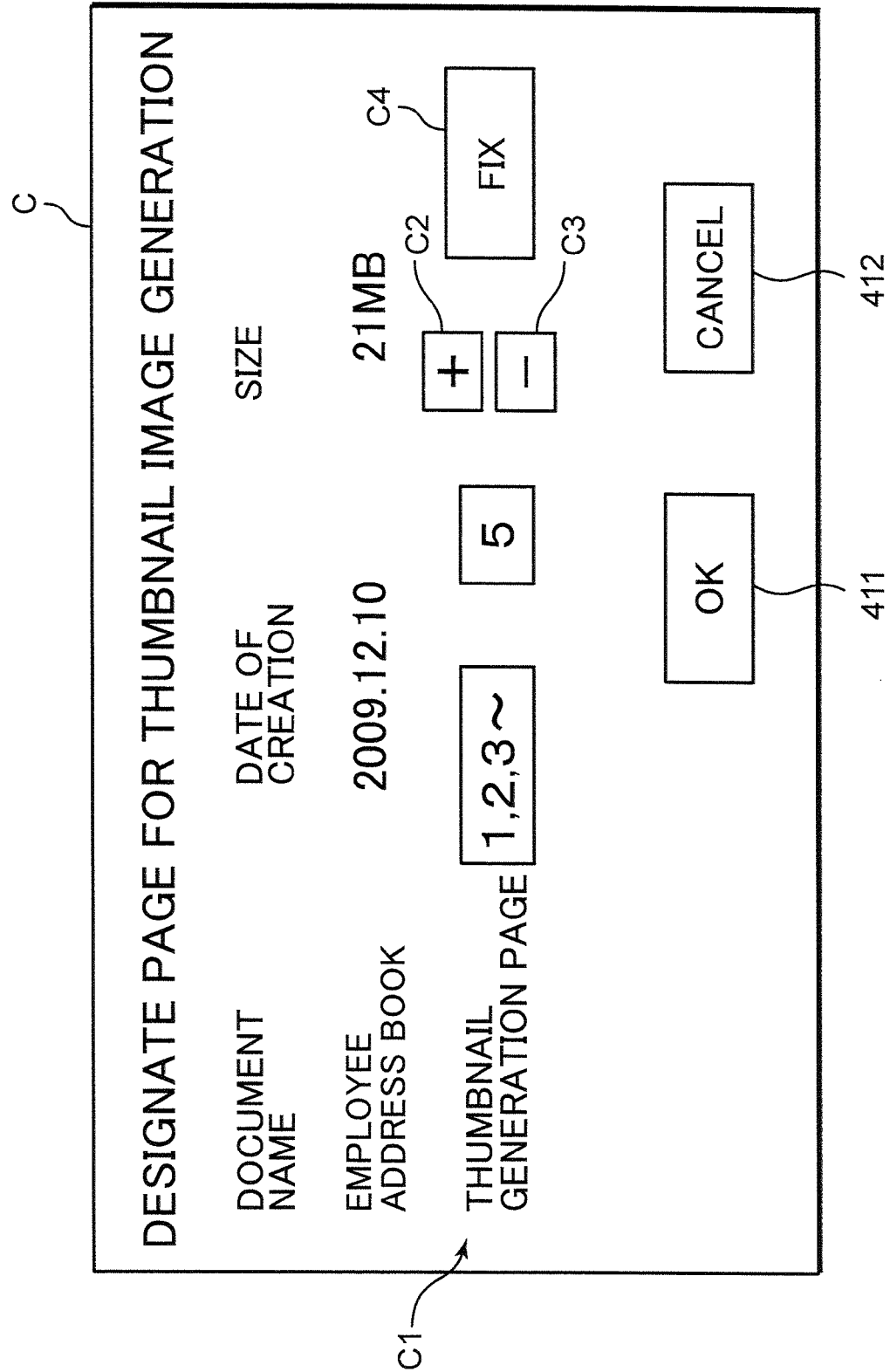
FIG. 7 is a diagram showing an exemplary display screen.

Next, a first embodiment of setting thumbnail image generation for each image data in the multifunction peripheral 1 is described. FIG. 4 is a flow chart showing a first embodiment of a process at the time of setting the thumbnail image generation for each image data in the multifunction peripheral 1. FIGS. 5 to 7 are diagrams showing exemplary display screens.

When a main power supply of the multifunction peripheral 1 is turned on by an operator, the display controller 522 causes the display unit 410 to display an initial screen A as shown in FIG. 5 (S1). In this embodiment is shown an example in which the display controller 522 causes the display unit 410 to display a display screen enabling setting of operation conditions of the copy function as the initial screen A.

When a document box key 4341 provided as the function changeover key 434 in the operation unit 400 is depressed by the operator while the initial screen A is displayed on the display unit 410 and a list display instruction to the effect of displaying a list of document data stored, for example, in the HDD 74 is received by the display controller 522 via the operation unit 400 based on this depressing operation (YES in S2), the display controller 522 causes the display unit 410 to display a stored document list screen B (an example is shown in FIG. 6) showing a list of the names of the respective document data stored in the HDD 74 (S3).

On the other hand, if no list display instruction is received and another instruction is input from the operator during the display of the initial screen A on the display unit 410 (NO in S2), another operation based on this instruction is performed by the operation controller 521 (S11).

Document name display buttons B11 to B13 on each of which the name of the document data is displayed, a thumbnail image display instruction input button B2, a thumbnail image generation setting button B3 and the like are displayed on the stored document list screen B during the display of the stored document list screen B on the display unit 410 by the display controller 522.

Here, a thumbnail display process is performed (S170) when designation of specific document data is received by the operation unit 400 by the touch panel function based on the depression of any one of the document name display buttons B11 to B13 by the operator during the display of the stored document list screen B (YES in S4) and the thumbnail image display instruction input button B2 is pressed ("THUMBNAIL DISPLAY" in S5).

On the other hand, the display controller 522 causes the display unit 410 to display a thumbnail setting screen C showing a message prompting the operator to input an instruction to designate a page, for which a thumbnail is to be generated, as shown in FIG. 7 (S6) when designation of specific document data is received by the operation unit 400 by the touch panel function based on the depression of any one of the document name display buttons B11 to B13 by the operator during the display of the stored document list screen B (YES in S4) and the thumbnail image generation setting button B3 is pressed and an instruction to start a setting process for the thumbnail image generation is received by the display controller 522 ("THUMBNAIL SETTING" in S5).

This thumbnail setting screen C displays detail information (name, date of creation, size, etc.) of the designated document data and also a thumbnail generation page designation button C1, an OK button 411 and a cancel button 412.

The thumbnail generation page designation button C1 receives an instruction as to for which of the respective pages of the designated document data a thumbnail image is to be generated from the operator by the touch panel function. The number of the pages to be preview-displayed by thumbnail image can be designated by pressing a + button C2 and a − button C3, and the number of the pages for which thumbnail images are to be generated is received by pressing a fix button C4. The operator repeats page number designation by operating the + button C2 and − button C3 and input of a fix by pressing the fix button C4.

When designation of the pages, for which a thumbnail image is to be generated, out of the respective pages constituting the designated document data is received by the thumbnail image generation instruction receiving section 523 in this way (YES in S7), the thumbnail image generation instruction receiving section 523 receives the input designated pages as pages for which thumbnail images are to be generated (S8).

This process of receiving the page designation and the designated page is performed until the OK button 411 of the thumbnail setting screen C is pressed by the operator and an instruction to finish the page designation input is received by the thumbnail image generation instruction receiving section 523 (NO in S9). When the OK button 411 is pressed by the operator and the instruction to finish the page designation input is received by the thumbnail image generation instruction receiving section 523 (YES in S9), the respective designated pages are stored as pages, for which thumbnail images are to be generated, in the thumbnail image generation instruction receiving section 523 (S10).

Figure 8:
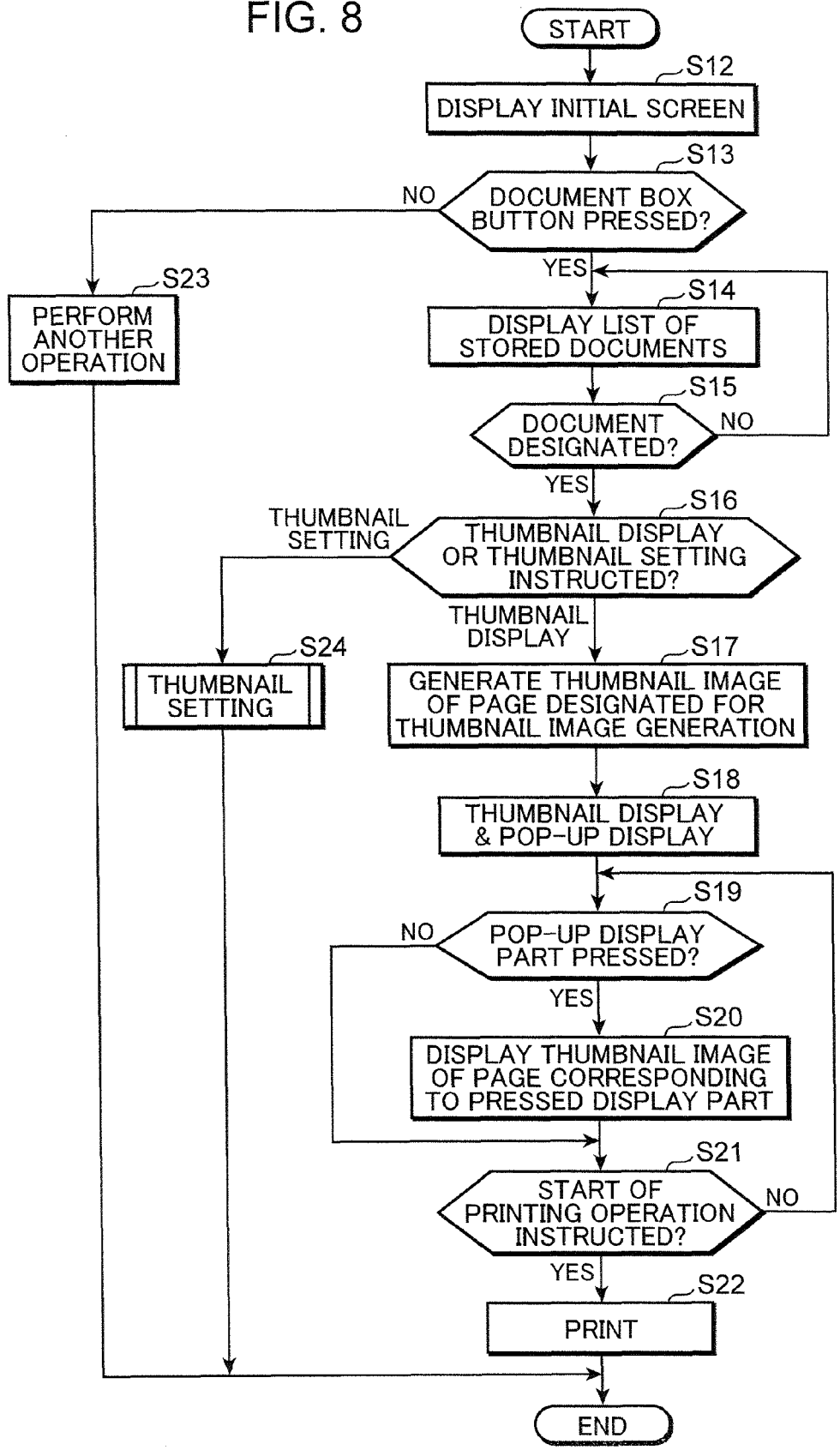
FIG. 8 is a flow chart showing a thumbnail image display process by the multifunction peripheral.
Figure 9:
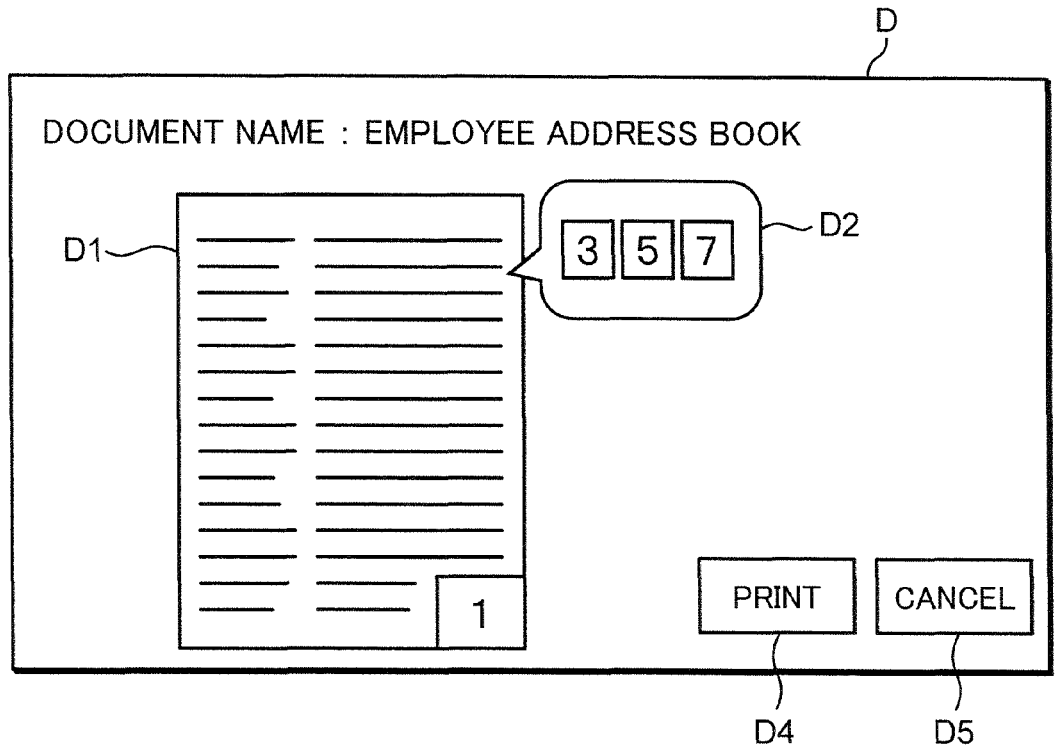
FIG. 9 is a diagram showing an exemplary display screen.
Figure 10:
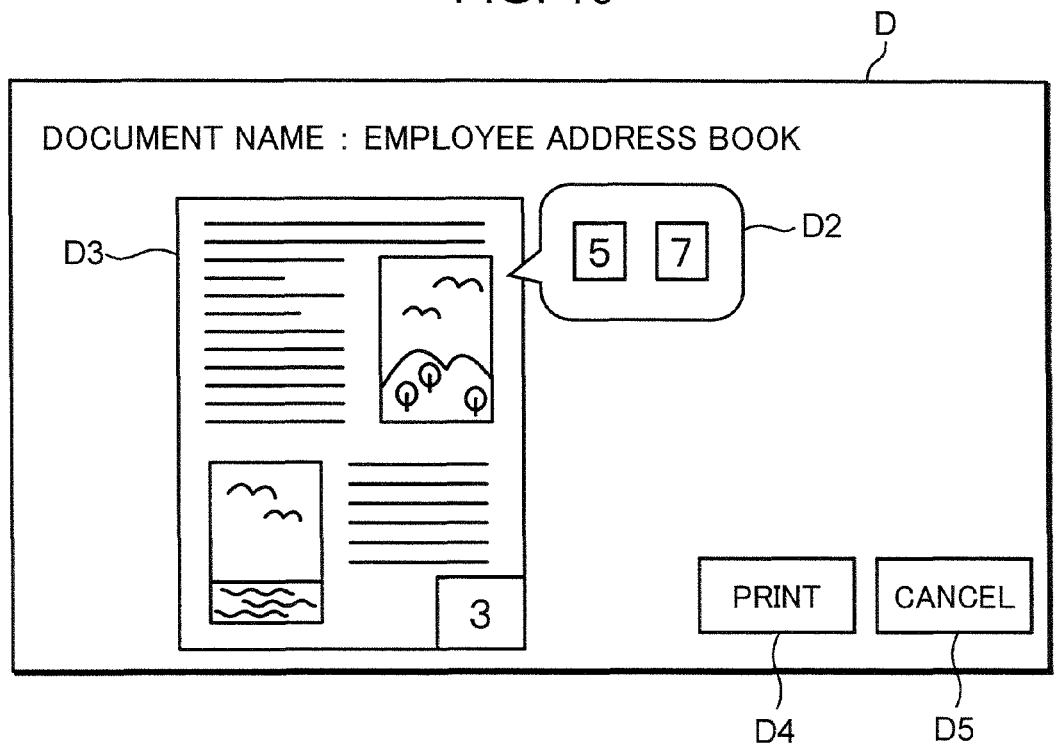
FIG. 10 is a diagram showing an exemplary display screen.

Next, a thumbnail image display process by the multifunction peripheral 1 is described. FIG. 8 is a flow chart showing the thumbnail image display process by the multifunction peripheral 1. FIGS. 9 and 10 are diagrams showing exemplary display screens. Note that processings similar to those shown in FIG. 4 are not described.

The thumbnail display process is started (S17 to S20, S170 of FIG. 4) when the names of the document data are displayed, any one of the document name display buttons B11 to B13 is pressed by the operator during the display of the stored document list screen B by the display controller 522 and, thereby, designation of a specific document is received by the operation unit 400 by the touch panel function (YES in S15) and the thumbnail image display instruction input button B2 is pressed ("THUMBNAIL DISPLAY" in S16).

In other words, when the display controller 522 receives an instruction to display thumbnail images for the designated document data based on the pressing of the thumbnail image display instruction input button B2 on the stored document list screen B by the operator, the thumbnail image generating section 524 generates thumbnail images for the pages indicated by page information out of all the pages constituting the document data in accordance with the page information on the pages received by the thumbnail image generation instruction receiving section 523 and designated to be displayed as thumbnail images (S17). Further, in this embodiment, the thumbnail image generating section 524 also generates a thumbnail image of the front page of the designated document. The generated thumbnail images of the respective pages are stored, for example, in the data storage 53.

After the generation of the thumbnail images, the display controller 522 causes the display unit 410 to display the generated thumbnail image of the front page and a pop-up image indicating the pages based on the page information indicating the pages for which the generation instruction was received by the thumbnail image generation instruction receiving section 523 and thumbnail images were generated (S18). For example, the display controller 522 causes the display unit 410 to display a thumbnail display screen D displaying only a thumbnail image D1 of the front page of the designated document data and also a pop-up image D2 indicating the pages for which the generation instruction was received by the thumbnail image generation instruction receiving section 523 and thumbnail images were generated as shown in FIG. 9. Note that this thumbnail display screen D shows an example in which the pages 3, 5 and 7 were designated as pages for which thumbnail images are to be generated.

When a display part of any piece of page information of the pop-up image D2 is pressed by the operator during the display of this thumbnail display screen D (YES in S19), an instruction to display the thumbnail image of the page corresponding to the pressed display part is received by the page designation receiving section 525. The display controller 522 reads data of the thumbnail images of the pages received by the page designation receiving section 525 from the data storage 53 and causes a corresponding thumbnail image to be displayed instead of the thumbnail image of the front page or that of another page being displayed on the display unit 410 at this point of time (S20). At this time, as shown in FIG. 10, the display controller 522 causes, together with the display of this thumbnail image D3 displayed anew, a pop-up display of an image indicating the page (page 5 or 7 in the example of FIG. 10) other than the page displayed as the thumbnail image D3 (page 3 in the example of FIG. 10) and received as the page, for which a thumbnail image is to be generated, by the thumbnail image generation instruction receiving section 523. Thereafter, this routine returns to S19 (NO in S21).

When a print button D4 displayed on the thumbnail display screen D is pressed by the operator and an instruction to form an image of the thumbnail-displayed document is received by the operation controller 521 by the touch panel function during the thumbnail display and the pop-up display (YES in S21), the operation controller 521 causes the printer unit 31 to perform an image forming operation (printing operation) for the designated document data (S22). Note that the operation controller 521 ends the routine without causing the image forming operation to be performed if a cancel button D5 is pressed.

In the first embodiment, it is preferable that the thumbnail image generating section 524 generates a thumbnail image added with an image indicating page number information of a changed page based on which the thumbnail image was generated at the time of thumbnail image generation or the display controller 522 causes an image indicating the page number information of the changed page based on which the thumbnail image was generated to be displayed in addition to the thumbnail image during the display of the thumbnail image. Note that the same holds for embodiments described below.

For example, in the case of displaying thumbnail images of a document on a display unit as in a conventional image forming apparatus, the thumbnail images displayed on the display unit increase as the number of pages of the document increases. Since it is difficult in many cases to provide the display unit with a large screen due to restriction of apparatus construction, the thumbnail images are displayed in a small size on the display unit. Thus, it becomes difficult for an operator to find a desired document or desired page by grasping the contents of the documents and the respective pages and it takes time to find the desired page. On the other hand, if the display unit is enlarged to have a large screen to display the contents of the document in a large size, it leads to an increase in production cost.

However, according to the above embodiment, the thumbnail images of only the pages designated by the operator can be displayed on the display unit 410 and the operator can cause the thumbnail image of the desired page to be easily displayed by the above pop-up image display. Thus, the operator can grasp the content of the document and easily find the desired page without enlarging the display screen of the display unit 410.

Figure 11:
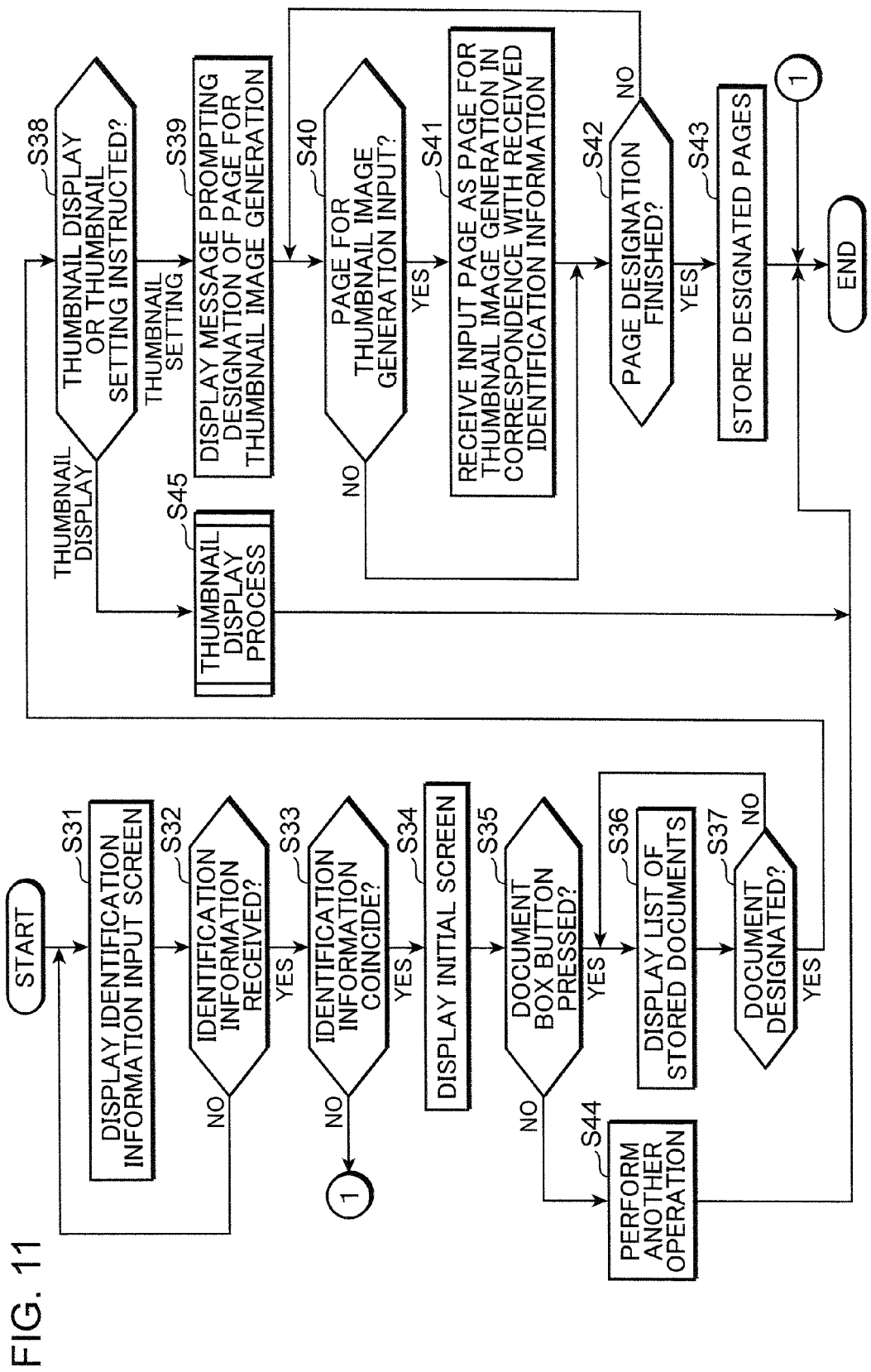
FIG. 11 is a flow chart showing a second embodiment of the process performed at the time of setting for thumbnail image generation for image data in the multifunction peripheral.
Figure 12:
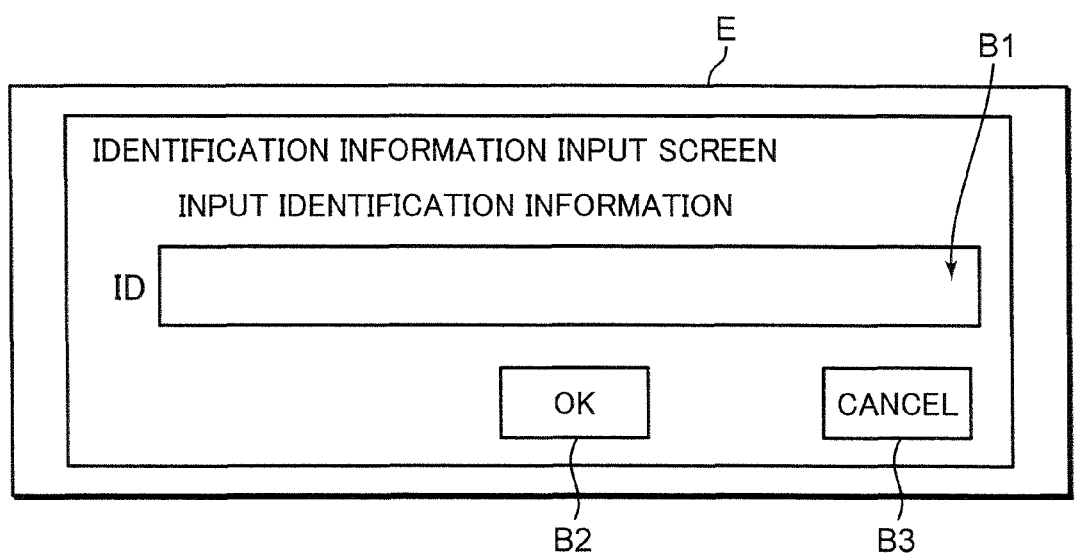
FIG. 12 is a diagram showing an exemplary display screen.

Next, a second embodiment of setting thumbnail image generation for document data in the multifunction peripheral 1 is described. FIG. 11 is a flow chart showing a second embodiment of the process at the time of setting the thumbnail image generation for the document data in the multifunction peripheral 1. FIG. 12 is a diagram showing an exemplary display screen. Note that processings similar to those of the first embodiment are not described.

In this second embodiment is described the process in which identification information is input for login by the operator at the time of starting the multifunction peripheral 1 and the multifunction peripheral 1 performs a display control of the display unit 410 and the like using contents corresponding to each operator.

When the multifunction peripheral 1 is started, the display controller 522 causes the display unit 410 to display an identification information input screen E as exemplarily shown in FIG. 12 (S31). When the identification information unique to the operator is input through the operation of the operation unit 400 by the operator and received by the identification information receiving section 527 during the display of this identification information input screen E (YES in S32), the display controller 522 judges whether or not the received identification information coincides with identification information stored beforehand in the identification information receiving section 527 (identification information given to the operator permitted to operate the multifunction peripheral 1) (S33), and the operator who input the identification information is permitted to login the multifunction peripheral 1 and an initial screen A is displayed (S34) if the two pieces of identification information coincide (YES in S33).

Thereafter, when designation of the page for which a thumbnail image is to be generated is received by the thumbnail image generation instruction receiving section 523 through an operation made to a thumbnail setting screen C during the display of this thumbnail setting screen C (YES in S40), the thumbnail image generation instruction receiving section 523 receives the input page as a page for which a thumbnail image is to be generated after relating it to the identification information received in S32 (S41). In other words, the thumbnail image generation instruction receiving section 523 receives each page, for which a thumbnail image is to be generated, for the document data designated in S37 for each piece of identification information received in S32. Thereafter, when the OK button 411 is pressed by the operator and an instruction to finish the page designation input is received by the thumbnail image generation instruction receiving section 523 (YES in S42), the respective designated pages are stored as pages, for which thumbnail images are to be generated, for the document data designated in S37 in the thumbnail image generation instruction receiving section 523 in correspondence with the identification information received in S32 (S43). In other words, the thumbnail image generation instruction receiving section 523 stores the information of the respective designated pages, for which thumbnail images are to be generated, for each different piece of identification information received in S32 even if the document data is same.

Figure 13:
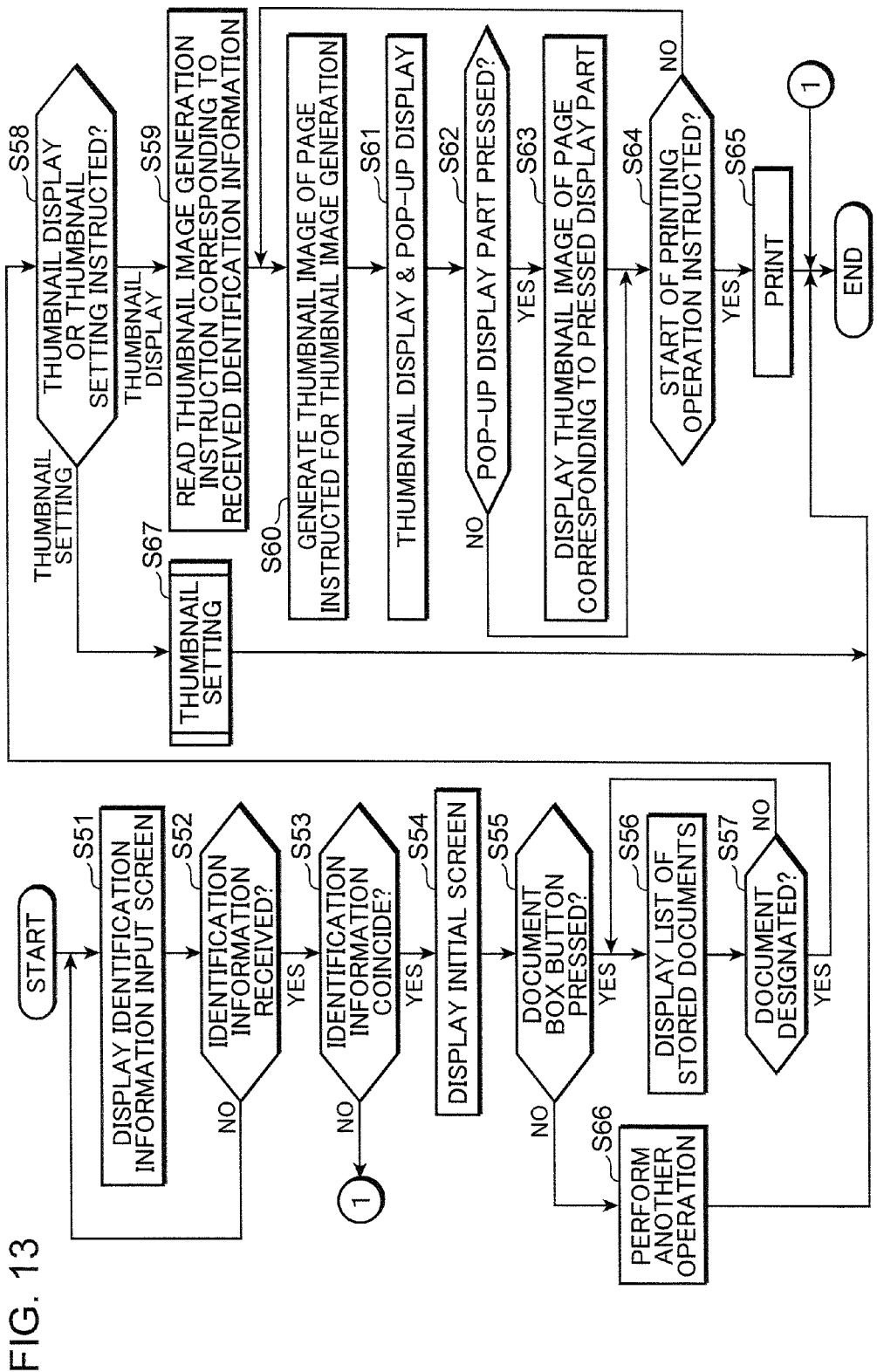
FIG. 13 is a flow chart showing a second embodiment of the thumbnail image display process by the multifunction peripheral.

Next, a second embodiment of the thumbnail image display process by the multifunction peripheral 1 is described. FIG. 13 is a flow chart showing the second embodiment of the thumbnail image display process by the multifunction peripheral 1. Note that processings similar to those shown in FIG. 4, 8 or 11 are not described.

In the thumbnail image display process according to this second embodiment, a login process (S51 to S53 in the second embodiment shown in FIG. 13) similar to the process of setting the thumbnail image generation shown in FIG. 11 is performed when the multifunction peripheral 1 is started.

Thereafter, page information stored in the thumbnail image generation instruction receiving section 523 in correspondence with the identification information received in S52 and indicating pages designated to have thumbnail images thereof displayed for the designated document is read (S59) when designation of a specific document is received by the operation unit 400 by the touch panel function based on the pressing of the button out of the document name display button B11 to B13 by the operator during the display of the stored document list screen B (YES in S57) and the thumbnail image display instruction input button B2 is pressed and the display controller 522 receives an instruction to display thumbnail images for the designated document data ("THUMBNAIL DISPLAY" in S58). The thumbnail image generating section 524 generates thumbnail images for the pages indicated by the page information out of all the pages constituting the document data in accordance with the read page information (S60).

In this way, in the second embodiment, important pages set so that thumbnail images thereof can be displayed are guided by a pop-up image for each of different operators having difference pieces of identification information, and the thumbnail images of the important pages can be displayed on the display unit by an operation easy for the operator.

Figure 14:
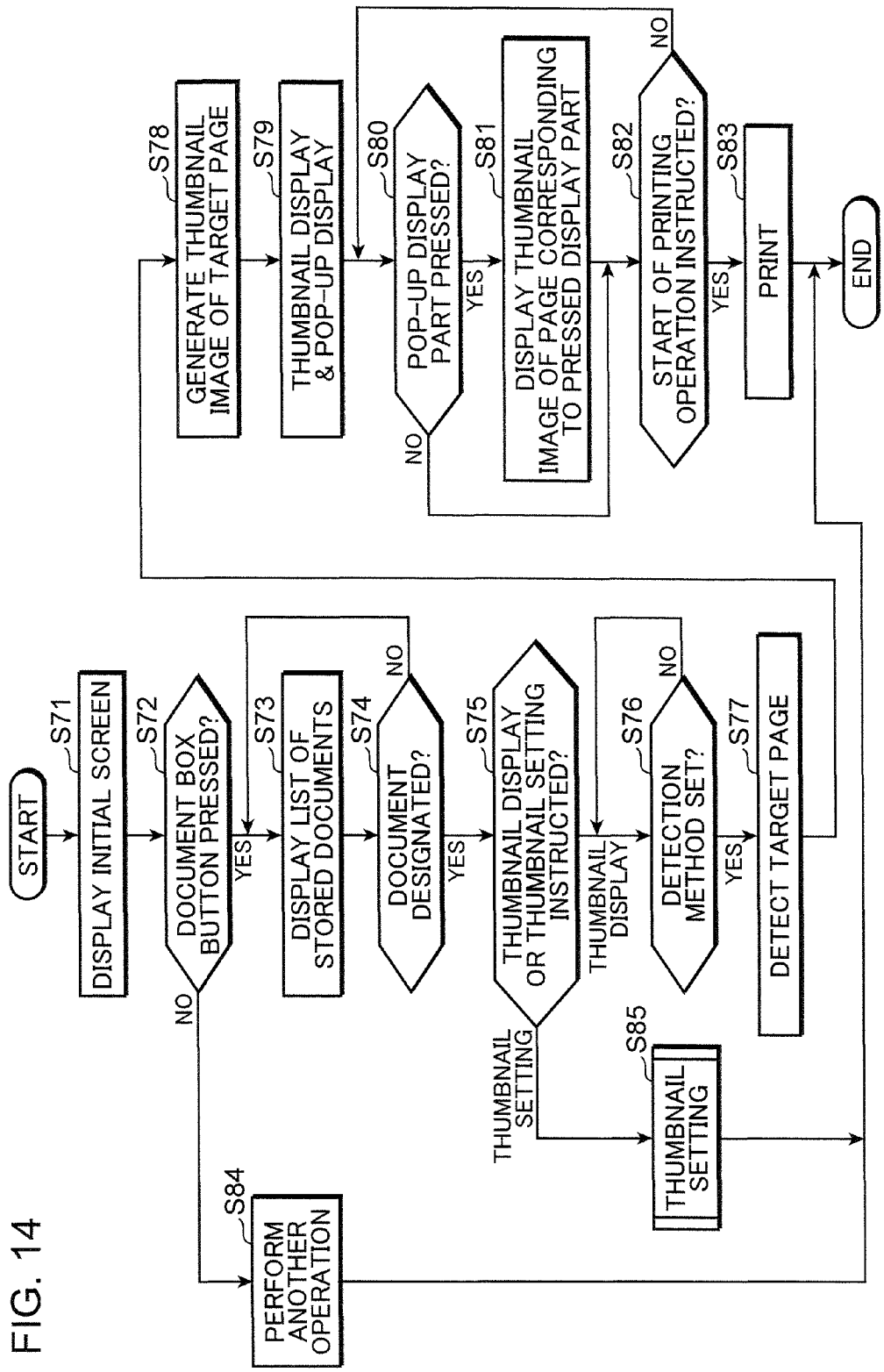
FIG. 14 is a flow chart showing a third embodiment of the thumbnail image display process by the multifunction peripheral.
Figure 15:
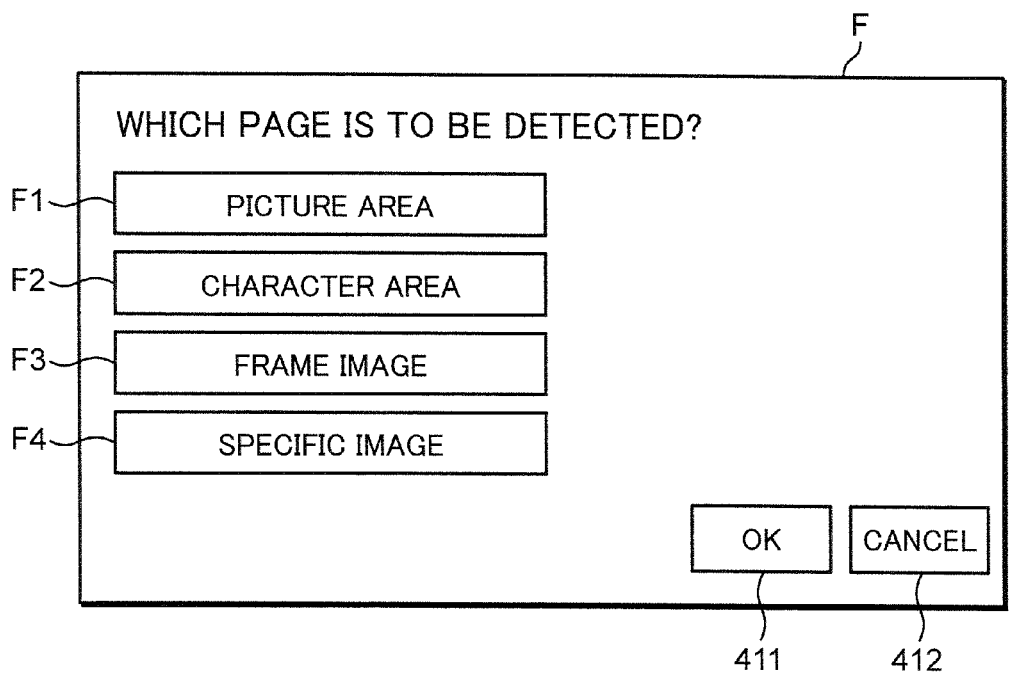
FIG. 15 is a diagram showing an exemplary display screen.

Next, a third embodiment of the thumbnail image display process by the multifunction peripheral 1 is described. FIG. 14 is a flow chart showing the third embodiment of the thumbnail image display process by the multifunction peripheral 1. FIG. 15 is a diagram showing an exemplary display screen. Note that processings similar to those shown in FIG. 4, 8, 11 or 13 are not described.

In the thumbnail image display process according to this third embodiment, the display controller 522 causes a detection method setting screen F, for example, as shown in FIG. 15 to be displayed when designation of a specific document is received by the operation unit 400 by the touch panel function based on the pressing of the document name display button B1 or the like by the operator during the display of the stored document list screen B (YES in S74) and the thumbnail image display instruction input button B2 is pressed ("THUMBNAIL DISPLAY" in S75). On this detection method setting screen F are displayed a picture area button F1 for receiving input of an instruction to detect pages having a picture area occupancy of a predetermined value or higher, a character area button F2 for receiving input of an instruction to detect pages having a character area occupancy of a predetermined value or higher, a frame image button F3 for receiving input of an instruction to detect pages including a frame image, and a specific image button F4 for receiving input of an instruction to detect pages including an already registered image (specific image) described above.

When any one of the picture area button F1, the character area button F2, the frame image button F3 and the specific image button F4 is pressed by the operator based on an operation made to the detection method setting screen F during the display of this detection method setting screen F and input of a corresponding instruction to detect pages having a picture area occupancy of a predetermined value or higher, pages having a character area occupancy of a predetermined value or higher, pages including a frame image or pages including an already registered image is received by the target page detecting section 526 (YES in S76), the target page detecting section 526 detects target pages by the input detection method from images of the respective pages constituting the designated document (S77) and the thumbnail image generating section 524 generates thumbnail images of the detected target pages out of all the pages constituting the document (S78). However, the target page detecting section 526 may perform the above detection by a predetermined detection method without the processing of S76 being performed.

Then, the display controller 522 causes the display unit 410 to display a pop-up image indicating page information of the detected target pages together with a thumbnail image of, for example, the front page of the document data designated in S74 (S79). The succeeding processings are similar to those in S19 to S22 shown in FIG. 8 or the like.

As described above, in the third embodiment, the pages assumed to be targeted by the operator are accurately extracted from the respective pages constituting the document data and the operator can grasp that the thumbnail images can be displayed by the pop-up image.

Note that the present invention is not limited to the constructions of the above embodiments and various modifications are possible.

For example, in the above respective embodiments, the display controller 522 causes the thumbnail image of the front page generated by the thumbnail image generating section 524 for the designated document data to be displayed during the display of the thumbnail image of the designated document data (S18 of FIG. 8 or the like). Instead, the thumbnail image generating section 524 may generate thumbnail images only for the pages designated for thumbnail image generation for the designated document data and the display controller 522 may cause the display unit 410 to display only any one of the thumbnail images generated for the designated pages.

Further, although the present invention is applied to generate and display the thumbnail images of the document data stored in the HDD 74 in the above respective embodiments, it is also applicable in the case of generating and displaying thumbnail images of image data when image data of a document read by the document reading unit 500, image data obtained from a LAN-connected (or Internet-connected) personal computer by the network I/F unit 71, image data obtained from an external facsimile machine by the facsimile communication unit 75 or document data (image data) stored in an external memory or the like connected to the multifunction peripheral 1 via the unillustrated I/F is stored in the data storage 53 or the HDD 74 and used for image formation or display on the display unit 410.

Figure 16:
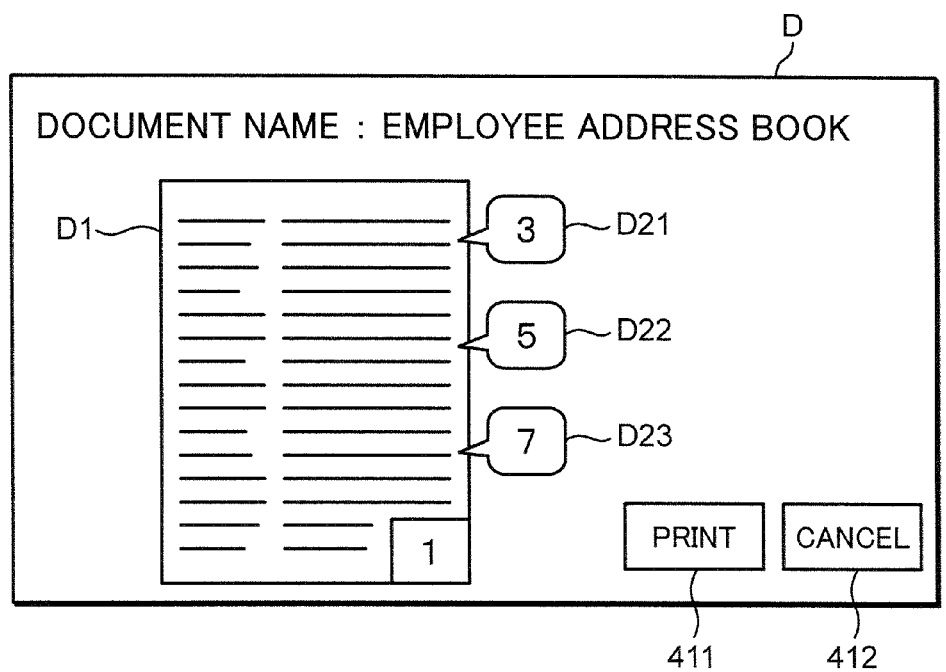
FIG. 16 is a diagram showing an exemplary display screen.

In the above respective embodiments, the display controller 522 causes all the pages for which the thumbnail images can be displayed, for example, as shown in FIGS. 9 and 10 to be displayed by one pop-up image. Instead, the display controller 522 may cause different pop-up images D21, D22 and D23 to be displayed for the respective pages for which the thumbnail images can be displayed, as on a thumbnail display screen D exemplarily shown in FIG. 16. This enables the operator to clearly grasp the pages designated for thumbnail image generation.

Next, there are described an image display device and an image forming apparatus including the image display device according to another embodiment of the present invention.

Figure 17:
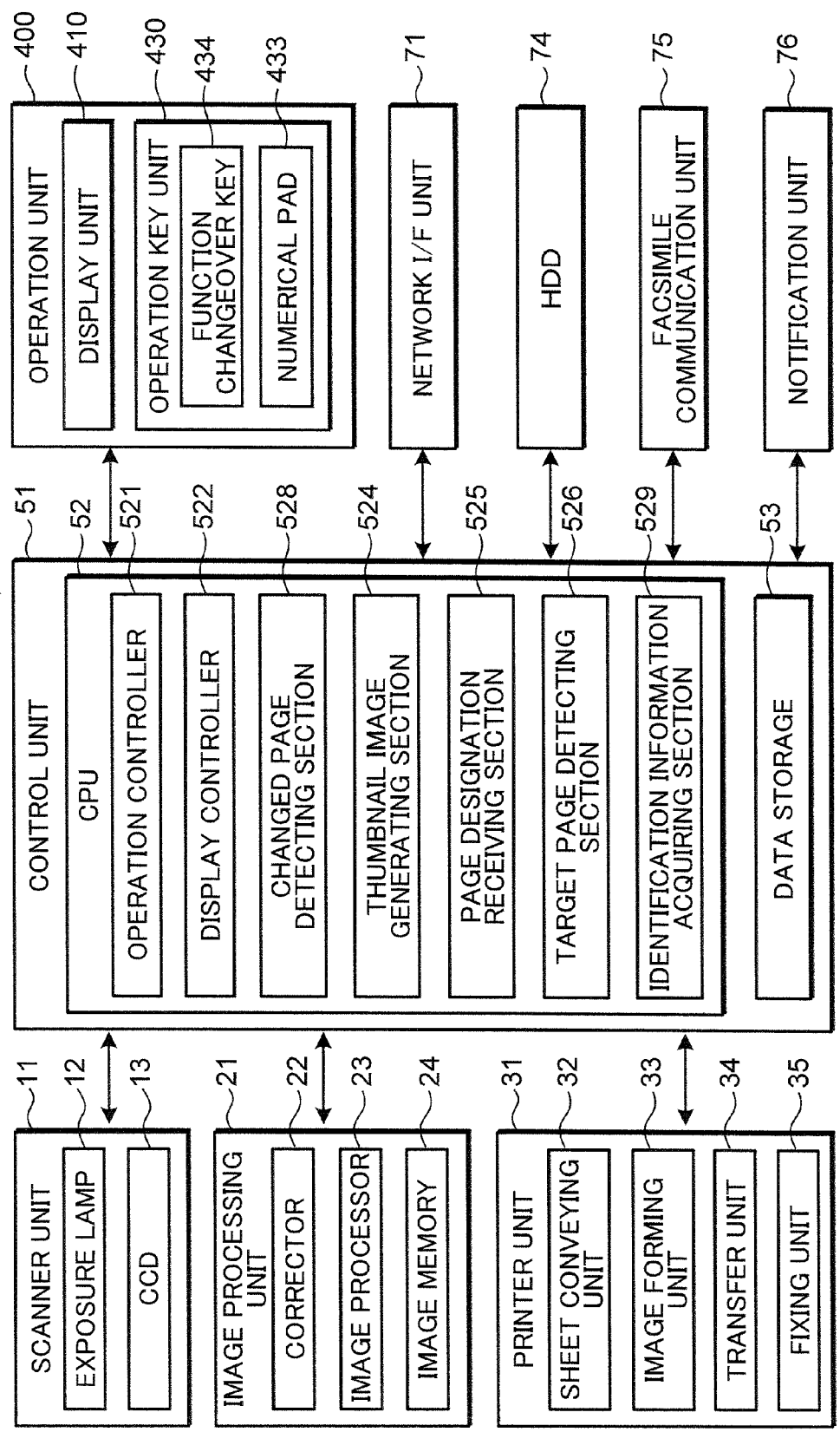
FIG. 17 is a control block diagram of a multifunction peripheral according to another embodiment.

FIG. 17 is a control block diagram of a multifunction peripheral according to the other embodiment. Note that constructions similar to the multifunction peripheral according to the above embodiment described with reference to FIG. 3 are not described.

A CPU 52 includes an operation controller 521, a display controller 522, a changed page detecting section 528, a thumbnail image generating section 524, a page designation receiving section 525 and an identification information acquiring section 529.

The changed page detecting section 528 detects, for image data obtained from a LAN-connected (or Internet-connected) personal computer by the network I/F unit 71 (hereinafter, this image data is referred to as document data) or other data, whether change history information indicating content updating is attached for each page of each file, for example, when the document data is composed of files. For example, the changed page detecting section 528 receives the document data and its change history information at the time of receiving the document data from the personal computer. Change history information recorded with a file when a document is changed or updated using a word processor at the time of document creation in the personal computer (e.g. change history information such as when both a main body of a document and the change history information including changed position data indicating a changed position constitute the document data) is used as this change history information.

For example, in the personal computer, a printer driver reads the change history information attached to the document data, treats the read change history information as data separate from the document main body and transmits it together with the document main data as the document data when transmitting the document data as print data or the like to the multifunction peripheral 1. The changed page detecting section 528 analyzes the change history information transmitted with the main data of the document data when this document data is received, and detects a changed page including a position changed at the latest update time of the document data from the document data updated at a time closest to the latest update time in the document data.

At this time, the changed page detecting section 528 can detect a change amount from the last update time on each changed page based on the analyzed change history information. For example, the changed page detecting section 528 detects this change amount by dividing a text amount at the changed position indicated by the change history information by an askey code.

The thumbnail image generating section 524 generates thumbnail images of, e.g. the front page of the document data and the changed page detected by the changed page detecting section 528. The thumbnail image generating section 524 generates at least the thumbnail image of the changed page detected by the changed page detecting section 528.

The display controller 522 causes the display unit 410 to display the thumbnail images of the respective pages generated by the thumbnail image generating section 524 and the changed page detected by the changed page detecting section 528, i.e. a pop-up image indicating the page number information of the changed page.

The image display device according to this embodiment is provided with the operation unit 400, the display unit 410, the display controller 522, the changed page detecting section 528, the thumbnail image generating section 524, the page designation receiving section 525 and, for example, the network I/F unit 71 as an image data acquiring section and further with the identification information acquiring section 529 according to the need of the process.

A display control program according to this embodiment is stored in a storage medium in the multifunction peripheral 1 such as the HDD 74 and the CPU 52 functions as the display controller 522, the changed page detecting section 528, the thumbnail image generating section 524, the page designation receiving section 525 and the identification information acquiring section 529 by performing an operation control in accordance with the display control program. This display control program is stored in the HDD 74 or the like by being read from a CD-ROM or DVD or being downloaded from a server on the Internet by the network I/F unit 71.

However, the realization of the display controller 522, the changed page detecting section 528, the thumbnail image generating section 524, the page designation receiving section 525 and the identification information acquiring section 527 is not limited to by the operation control of the CPU 52 in accordance with the display control program, and the display controller 522, the changed page detecting section 528, the thumbnail image generating section 524, the page designation receiving section 525 and the identification information acquiring section 529 may be provided as hardware in the form of circuits or the like.

Next, there is described a first embodiment of a thumbnail image display process in the multifunction peripheral 1 according to the other embodiment. FIG. 18 is a flow chart showing the first embodiment of the thumbnail image display process in the multifunction peripheral 1. Note that examples of display screens are described with reference to FIGS. 9 and 10.

When document data (main data of a document and change history information of the document) to be printed is received by the network I/F unit 71 from a personal computer on a network connected to the multifunction peripheral 1 (YES in S101), the operation controller 521 causes the data storage 53 to temporarily store the received document data (S102).

Subsequently, when the document data is received, the changed page detecting section 528 analyzes the change history information transmitted with the main data of the document and detects a changed page including a changed position in the document data changed at the latest update time of the document data from the document data at an update time closest to the latest update time (S103).

After the detection of the changed page by the changed page detecting section 528, the thumbnail image generating section 524 generates a thumbnail image for the page indicated by the change history information out of all the pages constituting the document data (main data) in accordance with the information of this changed page (S104). In this embodiment, the thumbnail image generating section 524 also generates a thumbnail image of the front page of the designated document. The generated thumbnail images of the respective pages are stored, for example, in the data storage 53.

After the generation of the thumbnail images, the display controller 522 causes the display unit 410 to display the generated thumbnail image of the front page and a pop-up image of the page number information of the changed pages for which the thumbnail images were generated (S105). For example, the display controller 522 causes the display unit 410 to display, for the document data, a thumbnail display screen D showing only a thumbnail image D1 of the front page of the document data and a pop-up image D2 indicating the page number information of changed pages for which thumbnail images were generated as shown in FIG. 9. Note that this thumbnail display screen D shows an example where the pages for which the thumbnail images were generated (changed pages) are pages 3, 5 and 7.

When a display part of any piece of page information of the pop-up image D2 is pressed by the operator during the display of this thumbnail display screen D (YES in S106), an instruction to display the thumbnail image of the page corresponding to the pressed display part is received by the page designation receiving section 525. The display controller 522 reads data of the thumbnail image of the page of the page number information received by the page designation receiving section 525 from the data storage 53 and causes this thumbnail image to be displayed instead of, for example, the thumbnail image of the front page or that of another page being displayed on the display unit 410 at this point of time (S107).

At this time, as shown in FIG. 10, the display controller 522 causes, together with the display of this thumbnail image D3 displayed anew, a pop-up display of an image indicating the page number information of the pages (also the changed pages, pages 5 and 7 in the example of FIG. 10) other than the page displayed as the thumbnail image D3 (page 3 in the example of FIG. 10) and received as the pages, for which thumbnail images are to be generated, by the thumbnail image generating section 524. Thereafter, this routine returns to 5106 (NO in S108).

When the print button D4 displayed on the thumbnail display screen D is pressed by the operator and an instruction to form an image of the thumbnail-displayed document is received by the operation controller 521 by the touch panel function during the thumbnail display and the pop-up display (YES in S108), the operation controller 521 causes the printer unit 31 to perform an image forming operation (printing operation) for the designated document data (S109). Note that the operation controller 521 ends the routine without causing the image forming operation to be performed if the cancel button D5 is pressed.

For example, in a conventional print preview display method, document images of respective pages are only displayed while being displaced by a predetermined width. Thus, images other than the document image on the frontmost displayed page have only end portions thereof displayed without being mostly displayed, and a user can grasp the content of the document image of the frontmost page, but cannot grasp the contents of the respective document images hidden behind the frontmost page. If a display area of the display unit is enlarged to enable the display of a plurality of document images, it causes an increase in production cost. Further, it is desired that pages assumed to be important to the operator can be accurately guided to the operator by the display unit.

However, according to this embodiment, it is possible to display thumbnail images of only the respective pages assumed to be important to the operator, i.e. only a reduced number of pages whose contents were updated on the display unit 410, and the operator can easily cause thumbnail images of desired pages to be displayed on the display unit 410 by an operation based on the pop-up image display. Thus, the operator can grasp the contents of the respective pages assumed to be important and easily find desired pages without enlarging the display screen of the display unit 410.

Figure 19A:
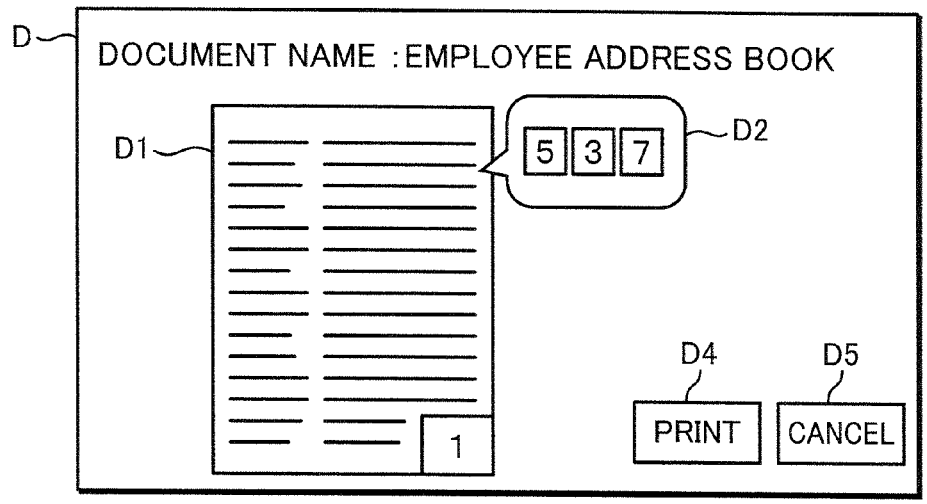
FIGS. 19A, 19B and 19C are diagrams showing exemplary display screens.
Figure 19B:
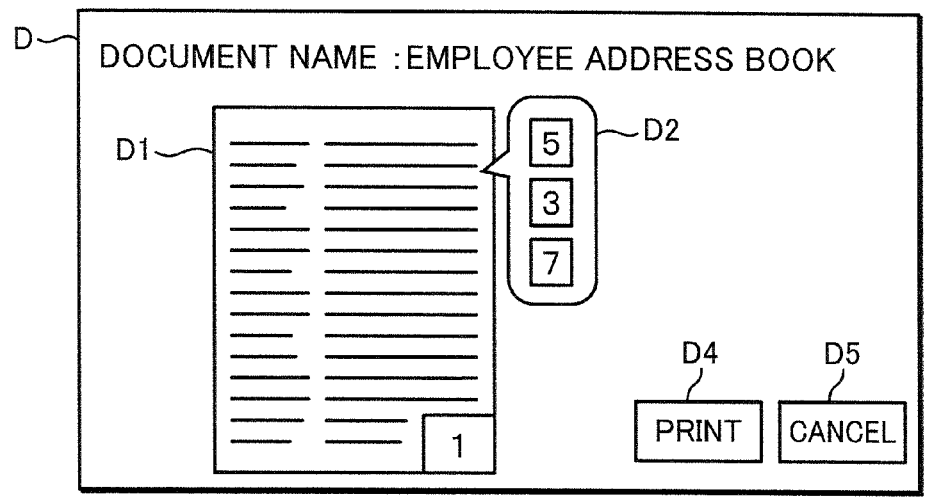
Figure 19C:
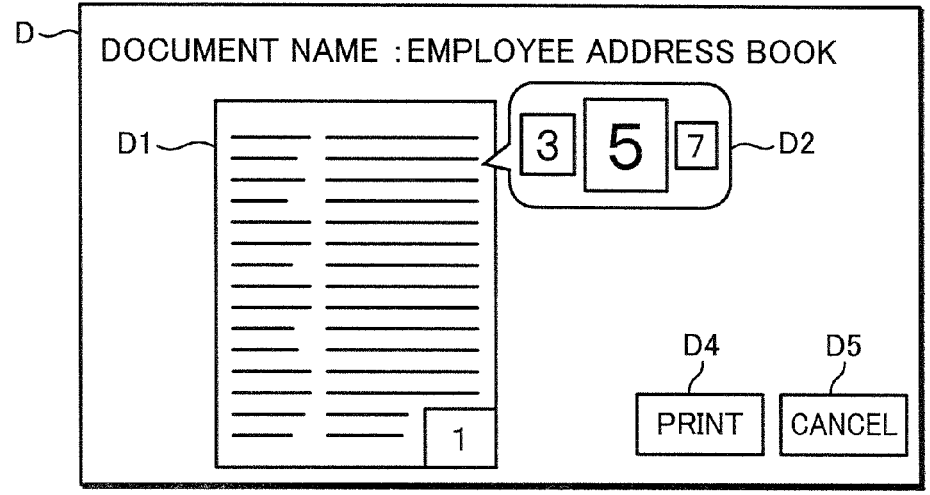

A modification of this first embodiment is described. In this modification, in S103 of the first embodiment, the changed page detecting section 528 detects not only the above changed position, but also a change amount for each page constituting the document data based on the change history information transmitted with the main data of the document when the document data is received. In S105 of the first embodiment, the display controller 522 causes a pop-up image to be displayed such that pieces of page number information indicating the respective changed pages, which were detected to include a changed position by having the change history information attached thereto, are arranged in a decreasing order of the change amount detected by the changed page detecting section 528. Exemplary display screens in this case are shown in FIG. 19. FIG. 19 show examples in which the changed pages for which the thumbnail images were generated are pages 3, 5 and 7 and the change amount decreases in an order of pages 5, 3 and 7. Although FIG. 19A shows the example in which the pieces of the page number information indicating the respective changed pages are horizontally arranged from left in the decreasing order of the change amount, the arrangement is not limited to this example. There may be employed another arrangement method in the decreasing order of the change amount such as the one of vertically arranging the pieces of page number information indicating the respective changed pages from top in the decreasing order of the change amount as shown in FIG. 19B or another method in which the larger the change amount is, the larger an image indicating the page number information of the changed page is displayed as shown in FIG. 19C.

In this embodiment, the display controller 522 causes the pop-up image to be displayed such that the pieces of the page number information, which should indicate the respective pages having the change history information attached thereto, are arranged in the decreasing order of the change amount of content updating. Thus, the page number information is displayed in the decreasing order of assumed importance of the pages to the operator and the operator can easily grasp a degree of importance for each page displayed in the pop-up image.

In the first embodiment and its modification, the thumbnail image generating section 524 preferably generates a thumbnail image added with an image indicating the page number information of the changed page, based on which the thumbnail image is generated, at the time of thumbnail image generation or the display controller 522 causes the image indicating the page number information of the changed page, based on which the thumbnail image was generated, to be displayed in addition to the thumbnail image at the time of thumbnail image display. The same holds for a second embodiment and its modification described below.

Next, there is described a second embodiment of the thumbnail image display process in the multifunction peripheral 1 according to the other embodiment. FIG. 20 is a flow chart showing the second embodiment of the thumbnail image display process in the multifunction peripheral 1 according to the other embodiment. An example of a display screen is described with reference to FIG. 12 described above. Note that processings similar to those of the first embodiment are not described.

In this second embodiment is described a process performed in the case where the operator inputs identification information to login when the multifunction peripheral 1 is started and the multifunction peripheral 1 performs a display control of the display unit 410 and the like using the contents corresponding to each operator.

When the multifunction peripheral 1 is started, the display controller 522 causes the display unit 410 to display an identification information input screen E as exemplarily shown in FIG. 12 (S111). When the identification information unique to the operator is input and received by the identification information acquiring section 529 by the operation of the operation unit 400 by the operator during the display of this identification information input screen E (YES in S112), the operation controller 521 judges whether or not the received identification information coincides with identification information stored beforehand in the identification information acquiring section 529 (identification information given to the operator permitted to operate the multifunction peripheral 1) (S113), and the operator who input the identification information is permitted to login the multifunction peripheral 1 and the multifunction peripheral 1 is brought to such a state where an operation such as a copying operation or a printing operation can be performed (S114) if the two pieces of identification information coincide (YES in S113).

In the second embodiment, the change history information as a part of the document data received from the personal computer by the multifunction peripheral 1 includes the identification information given to each operator (unique to each operator). In other words, when the above changed position data is recorded, the identification information indicating the operator who made this change is also recorded in correspondence with the changed position data. For example, when including a plurality of changed position data, the change history information includes identification information indicating the operator who made a change for each of the changed position data. The personal computer that transmits this document data to the multifunction peripheral 1 treats change history information including more than one pair of changed position data and its identification information as data separate from main data of a document and transmits it together with the main data of the document as document data by its printer driver.

When the document data to be printed and the change history information of the document data are received by the network I/F unit 71 from the personal computer on the network connected to the multifunction peripheral 1 during the operation of the multifunction peripheral 1 (YES in S115) and the operation controller 521 causes the data storage 53 to temporarily store the document data and its change history information (S116), the changed page detecting section 528 analyzes the change history information, extracts changed position data corresponding to the identification information received in S112 and detects the changed page including the changed position corresponding to the identification information received in S112 (S117).

After the detection of the changed page by the changed page detecting section 528, the thumbnail image generating section 524 generates thumbnail images for the pages indicated by the information on the changed pages out of all the pages constituting the document data in accordance with this changed page information (S118).

After the generation of the thumbnail images, the display controller 522 causes the display unit 410 to display the generated thumbnail image of the front page and a pop-up image indicating the page number information of the changed pages for which the thumbnail images were generated (S119).

When a display part of any piece of page information of the pop-up image D2 is pressed by the operator during the display of this thumbnail display screen D (YES in S120), an instruction to display the thumbnail image of the page corresponding to the pressed display part is received by the page designation receiving section 525 and the display controller 522 reads data of the thumbnail image of the page received by the page designation receiving section 525 from the data storage 53 and causes the corresponding thumbnail image to be displayed instead of the thumbnail image of the front page being displayed on the display unit 410 at this point of time (S121).

In this way, in the second embodiment, the changed pages can be guided by a pop-up image for each of different operators having different pieces of identification information and the thumbnail images of the changed pages assumed to be important can be displayed on the display unit by an operation simple for the operator.

Note that, in the above respective processes, an account used to login the personal computer may be used instead of the identification information.

A modification of this second embodiment is described. In this modification, in S117 of the second embodiment, the changed page detecting section 528 detects not only the above changed position for each piece of identification information described above, but also a change amount of the changed position for each piece of identification information for each page constituting the document data based on the change history information transmitted with the main data of the document when the document data is received. In S119 of the second embodiment, the display controller 522 causes a pop-up image to be displayed such that pieces of page number information indicating the respective changed pages, which were detected for each piece of identification information to include a changed position by having the change history information attached thereto, are arranged in a decreasing order of the change amount detected by the changed page detecting section 528. Display examples in this case are similar to those shown in FIGS. 19A to 19C.

The present invention is not limited to the above embodiments and various changes can be made.

For example, in the above respective embodiment and their modifications, the display controller 522 causes the thumbnail image of the front page generated by the thumbnail image generating section 524 to be displayed for the document data at the time of displaying the thumbnail images of the document data detected by the changed page detecting section 528 (S105 of FIG. 18, etc.). Instead, the thumbnail image generating section 524 may generate thumbnail images of pages (changed pages) designated to generate thumbnail images for the document data, and the display controller 522 may cause the display unit 410 to display only any one of the thumbnail images generated for these pages.

Further, in the respective embodiments and their modifications of the display process by the multifunction peripheral 1 according to the other embodiment, the application example of the present invention is described, taking the case as an example where image data is obtained by the network I/F unit 71 from the LAN-connected (or Internet-connected) personal computer. However, the present invention is also applicable in the case where document data (image data) stored in an external memory or the like to be connected to the multifunction peripheral 1 via the unillustrated I/F and image data stored in the HDD 74 are used for image formation, display on the display unit 410 and other purposes and thumbnail images are generated and displayed for the document data if the change history information is attached to the document data.

Further, in the respective embodiments and their modifications of the display process by the multifunction peripheral 1 according to the other embodiment, the display controller 522 causes pieces of page number information of all the pages, for which the thumbnail images can be displayed, to be displayed by one pop-up image, for example, as shown in FIGS. 9 and 10. Instead, the display controller 522 may cause different pop-up images D21, D22 and D23 corresponding to the respective pieces of page number information, for which thumbnail images can be displayed, to be displayed as on the above thumbnail display screen D exemplarily shown in FIG. 16. Also when the display controller 522 causes the pop-up image to be displayed such that the pieces of page number information are arranged in the decreasing order of the change amount in the respective modifications, different pop-up images are displayed for the respective pieces of page number information as in the example shown in FIG. 16. By doing so, the operator can more clearly grasp the pages designated to generate thumbnail images.

In the above respective embodiments and their modifications, the display controller 522 causes the thumbnail image of any of the changed pages generated by the thumbnail image generating section to be displayed on the initial screen at the time of thumbnail image display (S105 of FIG. 18, S119 of FIG. 20). Instead, the display controller 522 may cause the display unit 410 to display an icon image indicating the document data together with the pop-up image.

According to this, it is possible to display thumbnail images of only pages assumed to be important to the operator, i.e. only the pages whose contents were updated while displaying a feature or the like of the image data by an icon, and the operator can easily cause thumbnail images of desired pages to be displayed by the above pop-up image display.

The image display device of the present invention is not limited to application to the multifunction peripheral shown as an example above, and is also applicable to other image forming apparatuses such as facsimile machines, printers, multifunction peripherals (image forming apparatuses provided with functions of a copier, a facsimile machine, a printer and the like), etc. Further, the image display device can be applied not only to image forming apparatuses, but also to other electrical apparatuses such as mobile phones.

Pop-up images mentioned above are assumed to include a wide range of images to be displayed separately from the thumbnail images.

The constructions and processes shown in FIGS. 1 to 20 are merely examples of the constructions and processes of the image display device according to the present invention and not of the nature to limit the constructions and processes of the image display device and the image forming apparatus according to the present invention.

This application is based on Japanese Patent application serial Nos. 2010-066433 and 2010-066473 filed in Japan Patent Office on Mar. 23, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image display device, comprising:
 a display unit;
 an image data storage that stores image data constituted by images of a plurality of pages;
 a display controller that causes the display unit to display a first screen for input for an operator to designate pages of images to be generated as thumbnail images out of images of all pages constituting the image data stored in the image data storage, the first screen not including the thumbnail images;
a thumbnail image generation instruction receiving section that receives an instruction to generate the thumbnail images of the pages fewer than all of the pages and designated on the first screen; and
a thumbnail image generating section that generates thumbnail images of the pages indicated by the instruction received by the thumbnail image generation instruction receiving section out of the images of all of the pages constituting the image data;
wherein the display controller causes the display unit to display the thumbnail image of any one of pages generated by the thumbnail image generating section and a pop-up image indicating the pages for which the thumbnail images were generated by the thumbnail image generating section, and causes the display unit not to display thumbnail images of other pages generated by the thumbnail image generating section as a first control;
the display controller causes the display unit not to display the first screen when a second screen including the thumbnail image of any one of pages and the pop-up image, and not including the thumbnail images of other pages is displayed on the display unit by the first control, and causes the display unit not to display the second screen when the first screen is displayed on the display unit,
the image display device further comprising:
a page designation receiving section that receives the page designated by an operator out of the pages indicated by the pop-up image caused to be displayed by the display controller;
wherein, when page designation from the operator is received by the page designation receiving section, the display controller causes the display unit to display the thumbnail image of the received page instead of the thumbnail image displayed on the display unit at this point of time and the pop-up image indicating pages other than the page displayed as the thumbnail image and received as the pages by the thumbnail image generation instruction receiving section, and further causes the display unit not to display the pop-up image indicating the page of the thumbnail image displayed on the display unit at this point of time.

2. An image display device according to claim 1, further comprising an identification information receiving section that receives input of identification information for identifying the operator, wherein:
the thumbnail image generation instruction receiving section receives designation of the page, for which the thumbnail image is to be generated, for each piece of identification information, and
the display controller causes a pop-up image indicating the pages, which were received by the thumbnail image generation instruction receiving section and for which the thumbnail images were generated by the thumbnail image generating section, for each piece of identification information received by the identification information receiving section.

3. An image display device according to claim 1, wherein:
the display controller causes the pop-up image to be displayed for each page for which the thumbnail image was generated by the thumbnail image generating section.

4. An image display device according to claim 1, wherein:
the display controller causes the display unit to display a third screen including a first button, a second button and a plurality of third buttons, each of the third buttons displaying a name of the imaged data;
the display controller causes the display unit to display the first screen when any one of the plurality of third buttons is pressed and the first button is pressed; and
the display controller causes the display unit to display the second screen when any one of the plurality of third buttons is pressed and the second button is pressed.

5. A non-transitory computer-readable storage medium storing a display control program that causes a computer to function as:
a display controller that causes the display unit to display a first screen for input for an operator to designate pages of images to be generated as thumbnail images out of images of all pages constituting the image data stored in the image data storage, the first screen not including the thumbnail images;
a thumbnail image generation instruction receiving section that receives an instruction to generate the thumbnail images of the pages fewer than all of the pages designated on the first screen; and
a thumbnail image generating section that generates thumbnail images of the pages indicated by the instruction received by the thumbnail image generation instruction receiving section out of the images of all of the pages constituting the image data;
wherein the display controller causes the display unit to display the thumbnail image of any one of the pages generated by the thumbnail image generation section and a pop-up image indicating the pages for which the thumbnail images were generated by the thumbnail image generating section, and causes the display unit not to display thumbnail images of other pages generated by the thumbnail image generating section as a first control;
the display controller causes the display unit not to display the first screen when a second screen including the thumbnail image of any one of pages and the pop- up image, and not including the thumbnail images of other pages is displayed on the display unit by the first control, and causes the display unit not to display the second screen when the first screen is displayed on the display unit,
the display control program further causes the computer to function as:
a page designation receiving section that receives the page designated by an operator out of the pages indicated by the pop-up image caused to be displayed by the display controller;
wherein, when page designation from the operator is received by the page designation receiving section, the display controller causes the display unit to display the thumbnail image of the received page instead of the thumbnail image displayed on the display unit at this point of time and the pop-up image indicating pages other than the page displayed as the thumbnail image and received as the pages by the thumbnail image generation instruction receiving section, and further causes the display unit not to display the pop-up image indicating the page of the thumbnail image displayed on the display unit at this point of time.

6. A non-transitory computer-readable storage medium storing a display control program according to claim 5, the display control program further causes the computer to function as:
the display controller causes the display unit to display a third screen including a first button, a second button and a plurality of third buttons, each of the third buttons displaying a name of the imaged data;

the display controller causes the display unit to display the first screen when any one of the plurality of third buttons is pressed and the first button is pressed; and the display controller causes the display unit to display the second screen when any one of the plurality of third buttons is pressed and the second button is pressed.

* * * * *